(12) United States Patent
Ran et al.

(10) Patent No.: US 12,195,043 B2
(45) Date of Patent: Jan. 14, 2025

(54) INTELLIGENT INFORMATION CONVERSION FOR AUTOMATIC DRIVING

(71) Applicant: CAVH LLC, Fitchburg, WI (US)

(72) Inventors: Bin Ran, Fitchburg, WI (US); Renfei Wu, Madison, WI (US); Hanchu Li, Madison, WI (US); Yang Cheng, Middleton, WI (US); Kun Zhou, Madison, WI (US); Xiangliang Tuo, Madison, WI (US); Wanming Zhang, Madison, WI (US); Chang Xu, Madison, WI (US); Xiaotian Li, Madison, WI (US); Keshu Wu, Madison, WI (US)

(73) Assignee: CAVH LLC, Fitchburg, WI (US)

(*) Notice: Subject to any disclaimer, the term of this patent is extended or adjusted under 35 U.S.C. 154(b) by 318 days.

(21) Appl. No.: 17/570,766

(22) Filed: Jan. 7, 2022

(65) Prior Publication Data
US 2022/0219731 A1 Jul. 14, 2022

Related U.S. Application Data

(60) Provisional application No. 63/137,243, filed on Jan. 14, 2021.

(51) Int. Cl.
*B60W 60/00* (2020.01)
*G06V 20/56* (2022.01)
(Continued)

(52) U.S. Cl.
CPC ......... *B60W 60/0015* (2020.02); *G06V 20/56* (2022.01); *G06V 20/597* (2022.01);
(Continued)

(58) Field of Classification Search
CPC ......... B60W 60/0015; B60W 2552/05; B60W 2554/20; B60W 2554/40; B60W 2556/45;
(Continued)

(56) References Cited

U.S. PATENT DOCUMENTS 10,380,886 B2  8/2019  Ran et al.
10,692,365 B2  6/2020  Ran et al.
(Continued)

FOREIGN PATENT DOCUMENTS

CN  1501329 A  *  6/2004  ........... G07B 15/063
CN  103956045 A  *  7/2014
(Continued)

OTHER PUBLICATIONS

SAE International Standard J3016, "Taxonomy and Definitions for Terms Related to Driving Automation Systems for On-Road Motor Vehicles" (as revised in 2016 (J3016_201609)) Retrieved from the internet Dec. 12, 2016. 30 pages.
(Continued)

*Primary Examiner* — B M M Hannan
(74) *Attorney, Agent, or Firm* — Casimir Jones, S.C.; Thomas A. Isenbarger

(57) ABSTRACT

Provided herein is technology relating to automated driving and particularly, but not exclusively, to an intelligent information conversion system and related methods for providing collaborative automatic driving to intelligent transportation systems, vehicle networking systems, collaborative management control systems, vehicle-road collaborative systems, automated driving systems, and the like.

22 Claims, 8 Drawing Sheets

(51) Int. Cl.
*G06V 20/59* (2022.01)
*G08G 1/0967* (2006.01)
*H04L 67/12* (2022.01)
*G07C 5/00* (2006.01)

(52) U.S. Cl.
CPC ....... *G08G 1/096783* (2013.01); *H04L 67/12* (2013.01); *B60W 2552/05* (2020.02); *B60W 2554/20* (2020.02); *B60W 2554/40* (2020.02); *B60W 2556/45* (2020.02); *G07C 5/008* (2013.01)

(58) Field of Classification Search
CPC ...... G06V 20/56; G06V 20/597; G06V 10/96; G08G 1/096783; G08G 1/0133; G08G 1/0112; G08G 1/0116; G08G 1/166; G08G 1/0125; G08G 1/012; H04L 67/12; H04L 67/565; G07C 5/008; H04W 4/44
USPC ................................................ 701/23–25, 28
See application file for complete search history.

(56) References Cited

U.S. PATENT DOCUMENTS

| | | | |
|---|---|---|---|
| 10,867,512 | B2 | 12/2020 | Ran et al. |
| 11,375,352 | B2 * | 6/2022 | Dorrance ............ H04L 41/0896 |
| 2002/0150050 | A1 * | 10/2002 | Nathanson .............. H04L 41/12 |
| | | | 370/254 |
| 2010/0030423 | A1 * | 2/2010 | Nathanson .............. H04L 67/12 |
| | | | 701/33.4 |
| 2015/0052352 | A1 * | 2/2015 | Dolev ................... H04L 9/3278 |
| | | | 713/156 |
| 2018/0376305 | A1 * | 12/2018 | Ramalho de Oliveira .................. |
| | | | H04W 4/44 |
| 2019/0222652 | A1 * | 7/2019 | Graefe ..................... H04L 67/12 |
| 2019/0377074 | A1 * | 12/2019 | Sugae ..................... G01S 15/42 |
| 2019/0392712 | A1 * | 12/2019 | Ran ...................... G08G 1/0116 |
| 2020/0005633 | A1 | 1/2020 | Jin et al. |
| 2020/0114920 | A1 * | 4/2020 | Zhang ................... H04L 9/0891 |
| 2020/0137580 | A1 * | 4/2020 | Yang ..................... H04W 12/06 |
| 2020/0207371 | A1 * | 7/2020 | Dougherty ........ B60W 60/0017 |
| 2020/0245115 | A1 * | 7/2020 | Dorrance ........... G01C 21/3807 |
| 2020/0257298 | A1 * | 8/2020 | Ucar ...................... H04W 4/021 |
| 2020/0283014 | A1 * | 9/2020 | Wray ................... B60W 60/001 |
| 2021/0233397 | A1 * | 7/2021 | Zhang ................. G08G 1/0145 |
| 2021/0245773 | A1 * | 8/2021 | Lu ....................... B60R 16/0232 |
| 2022/0126864 | A1 * | 4/2022 | Moustafa ............ B60W 30/182 |
| 2022/0244046 | A1 * | 8/2022 | Yokogawa ............... G01C 3/06 |
| 2022/0353650 | A1 * | 11/2022 | Aldana ................. H04W 72/51 |
| 2022/0353732 | A1 * | 11/2022 | Filippou ........... H04W 28/0289 |
| 2023/0144209 | A1 * | 5/2023 | Cai ............................ G06T 5/20 |
| | | | 348/148 |

FOREIGN PATENT DOCUMENTS

| | | | | |
|---|---|---|---|---|
| CN | 103956045 | B | * | 12/2015 |
| CN | 105913059 | A | * | 8/2016 ............ G01N 29/04 |
| CN | 108922188 | A | * | 11/2018 ............ G08G 1/012 |
| CN | 109166314 | A | * | 1/2019 |
| CN | 109724610 | A | * | 5/2019 |
| CN | 110325928 | A | * | 10/2019 ........ B60W 30/0953 |
| CN | 110673602 | A | * | 1/2020 ............ G05D 1/0088 |
| CN | 110930747 | A | * | 3/2020 ....... G08G 1/096716 |
| CN | 110969833 | A | * | 4/2020 ............ G08G 1/0116 |
| CN | 111210618 | A | * | 5/2020 ............ G08G 1/0104 |
| CN | 111260946 | A | * | 6/2020 |
| CN | 108922188 | B | * | 12/2020 ............ G08G 1/012 |
| CN | 112188533 | A | * | 1/2021 ............ H04L 43/06 |
| CN | 112829753 | A | * | 5/2021 ............ B60W 40/02 |
| CN | 114283607 | A | * | 4/2022 |
| CN | 114283607 | B | * | 9/2022 |
| CN | 115562303 | A | * | 1/2023 |
| EP | 4123619 | A1 | * | 1/2023 .......... B60W 30/165 |
| WO | WO-0231793 | A2 | * | 4/2002 ............ G07C 5/008 |
| WO | WO-2017210901 | A1 | * | 12/2017 ............ B60W 30/00 |
| WO | WO-2019010049 | A1 | * | 1/2019 .......... H04W 12/069 |
| WO | WO-2020205597 | A1 | * | 10/2020 .......... B60W 30/182 |
| WO | WO-2021067140 | A1 | * | 4/2021 ............ H04L 67/10 |

OTHER PUBLICATIONS

SAE International Standard J3016, "Taxonomy and Definitions for Terms Related to Driving Automation Systems for On-Road Motor Vehicles". (as revised in 2018 (J3016_201806)) Retrieved from the internet Feb. 3, 2023. 35 pages.

SAE International Standard J3016, Sae International Standard J3016, "Taxonomy and Definitions for Terms Related to Driving Automation Systems for On-Road Motor Vehicles" (published in 2014 (J3016_201401)) Retrieved from the internet Sep. 17, 2019. 12 pages.

* cited by examiner

INTELLIGENT INFORMATION CONVERSION FOR AUTOMATIC DRIVING

This application claims priority to U.S. provisional patent application Ser. No. 63/137,243, filed Jan. 14, 2021, which is incorporated herein by reference in its entirety.

FIELD

Provided herein is technology relating to automated driving and particularly, but not exclusively, to an intelligent information conversion system and related methods for providing collaborative automatic driving to intelligent transportation systems, vehicle networking systems, collaborative management control systems, vehicle-road collaborative systems, automated driving systems, and the like.

BACKGROUND

Autonomous vehicles that are capable of sensing the environment and navigating without human input or with reduced human input are in development and experimental testing. However, widespread implementation and large-scale commercial use of autonomous vehicles have been limited by existing autonomous driving technologies that require complex and redundant on-board systems and roadside systems.

SUMMARY

Provided herein is technology related to systems and methods for an intelligent information conversion system (IICS), e.g., that finds use in supporting automatic driving (e.g., collaborative automated driving). Embodiments of the IICS and related methods provided herein support vehicle-road collaborative automatic driving and effectively reduce complexity and redundancy of automated driving systems. Accordingly, the IICS technology provided herein promotes the large-scale implementation of autonomous vehicles.

In some embodiments, the IICS finds use for any type of automated driving system and/or any type of intelligent road infrastructure system (IRIS). In some embodiments, the IICS finds use for a Connected Automated Vehicle Highway (CAVH) system, e.g., as described in U.S. Pat. No. 10,380,886, which is incorporated herein by reference. For example, in some embodiments, the IICS provides systems and methods to realize real-time and dynamic information exchange between the road end (e.g., road infrastructure) and the vehicle end (e.g., CAV) of an automated driving system by converting information into a form for use by CAV having a range of intelligence levels (e.g., vehicle automation level V1.5, V2, V3, or V4) when they enter road segments equipped with road infrastructure, e.g., IRIS (see U.S. Pat. Nos. 10,867,512 and/or 10,692,365, each of which is incorporated herein by reference).

In some embodiments, the IICS provides a "code book" for converting various types of information (e.g., by encoding and decoding information), e.g., for use by vehicles (e.g., CAV) having a range of intelligence levels (e.g., V1, V1.5, V2, V3, and/or V4) and for a plurality of vehicles (e.g., CAV) having a range of intelligence levels (e.g., V1, V1.5, V2, V3, and/or V4).

In some embodiments, the IICS provides sensing, decision-making, and control instructions to CAV for performing driving tasks. In some embodiments, the IICS is applicable for all road types and facilitates the intelligent allocation of automatic driving, enhances system service levels, and increases the levels of information, intelligence, and/or coordination for automatic driving and CAV.

Accordingly, in some embodiments, the technology provides an intelligent information conversion system (IICS) configured to connect an automatic driving system (ADS) and a connected and automated vehicle (CAV); and provide real-time dynamic information exchange between ADS and CAV. In some embodiments, wherein the ADS comprises an intelligent roadside infrastructure system (IRIS). In some embodiments, the IICS improves the service level of an ADS from a first service level to a second service level, wherein the first service level is not adequate to provide automatic driving for a CAV and the second service level is adequate to provide automatic driving for the CAV. In some embodiments, the IICS is configured to connect any ADS of a plurality of ADS and any CAV of a plurality of CAV; and provide real-time dynamic information exchange between any ADS of a plurality of ADS and any CAV of a plurality of CAV.

In some embodiments, the IICS comprises a code book providing a standardized format for information exchange. In some embodiments, the IICS is configured to sort information in a code book string. In some embodiments, the IICS is configured to encode information into a code book string. In some embodiments, the IICS is configured to decode information from a code book string. In some embodiments, the IICS comprises an encoding or encoding/decoding module configured to encode information into a code book string. In some embodiments, the IICS comprises an encoding/decoding module configured to decode information from a code book string.

In some embodiments, the standardized format for information exchange comprises a sequence of integers, wherein each integer has a value corresponding to a value of a category including vehicle automation level, original equipment manufacturer, vehicle brand, vehicle model year, vehicle type, road category, highway level, urban road level, road intelligence level, information function level, information category I (frequency), information category II (safety demand), information category III (precision), information category IV (scope), information category V (static and dynamic), or information category VI (name). In some embodiments, the standardized format for information exchange comprises a sequence of sixteen integers. In some embodiments, the IICS comprises an encoding/decoding module configured to facilitate real-time dynamic information interaction between CAV and ADS. In some embodiments, the IICS comprises an encoding/decoding module configured to facilitate real-time dynamic information interaction between CAV and road infrastructure. In some embodiments, the IICS comprises an encoding/decoding module configured to exchange information between CAV and ADS by encoding information received from a CAV and/or ADS into a code book string; and by decoding a code book string into information for transmission to a CAV and/or ADS.

In some embodiments, the code book string has a format provided by a code book standardized format for information exchange. Accordingly, in some embodiments, the code book string comprises a sequence of integers, wherein the position of an integer within the code book string (e.g., position 1, 2, 3, 4, 5, 6, 7, 8, 9, 10, 11, 12, 13, 14, 15, or 16 from leftmost to rightmost position within the code book string) is associated with a category of information and/or a descriptor of a category of information that is vehicle automation level, original equipment manufacturer, vehicle brand, vehicle model year, vehicle type, road category, highway level, urban road level, road intelligence level, information function level, information category I (frequency), information category II (safety demand), information category III (precision), information category IV (scope), information category V (static and dynamic), or information category VI (name); and each integer has a value corresponding to a value of the category indicated by the integer position. See, e.g., Table 1.

In some embodiments, the IICS comprises a road-side connector component (e.g., a data exchange interface connecting IICS and roadside infrastructure (e.g., IRIS)) configured to exchange information between the IICS and roadside infrastructure (e.g., IRIS); and a vehicle-side connector component (e.g., a data exchange interface connecting IICS and a vehicle (e.g., CAV)) configured to exchange information between the IICS and a vehicle (e.g., CAV).

In some embodiments, the IICS comprises a supporting subsystem comprising a cache subsystem and a power supply subsystem.

In some embodiments, the IICS is configured to provide service for an ADS of any intelligence level.

In some embodiments, the IICS is configured to integrate into an IRIS and/or a cloud platform.

In some embodiments, the IICS is configured to receive vehicle information and/or information demands from a vehicle. In some embodiments, the vehicle transmits vehicle information and/or information demands to the IICS. In some embodiments, the vehicle is driving on a road comprising an intelligent infrastructure. In some embodiments, the vehicle is driving on a road serviced by an ADS. In some embodiments, the vehicle is driving on a road serviced by an IRIS. In some embodiments, the vehicle comprises a vehicle intelligence unit (VIU). In some embodiments, the IICS comprises a vehicle-side connector configured to receive vehicle information and/or information demands from a vehicle and/or VIU.

In some embodiments, the IICS comprises an IRIS and the IRIS comprises a hierarchical structure comprising RIU configured to receive vehicle-side information from IICS and to exchange data with a TCU; TCU configured to exchange data with RIU, other TCU, and TCC; and to perform data fusion and processing functions; and TCC configured to perform decision-making and/or traffic control functions and to store data. In some embodiments, the TCC is provided in a cloud-based platform. In some embodiments, CAV comprise a vehicle-end connector component. In some embodiments, the vehicle-connector component comprises an environment sensing module configured to sense the surrounding environment of a CAV; and/or to collect data from external vehicle sensors; an internal environment sensing module configured to sense the status of the CAV, to sense the internal environment of the CAV, and to sense the driver status; and/or to collect data from internal vehicle sensors; a cognitive module configured to collect semantic information and/or cognitive information describing the CAV environment; and/or a decision-making module configured to provide vehicle control decisions. In some embodiments, the cognitive module is configured to integrate vehicle sensor information and roadside infrastructure information from IICS. In some embodiments, vehicle sensor information and roadside infrastructure information from IICS comprises information describing the environment of the CAV, obstacle types and locations, and/or vehicle driving trajectories. In some embodiments, the decision-making module is configured to make decisions based on stored data, stored control decisions, and/or stored outcomes of control decision execution. In some embodiments, the decision-making module is configured to make decisions based on control instructions received from IRIS through IICS. In some embodiments, the environment sensing module is configured to integrate data and/or information from vehicle sensors with data and/or information from roadside infrastructure sensors obtained from IICS to describe the vehicle environment and predict vehicle trajectory.

In some embodiments, IRIS is configured to issue control commands to execution modules of CAV having an intelligence level of V1 or V1.5 through the IICS; and the IRIS is configured to receive and/or store the result of executing the control commands for data backup and/or machine learning to adjust future control commands. In some embodiments, IRIS is configured to receive vehicle sensor information and/or data from IICS; receive roadside infrastructure sensor information and/or data; and provide driving decisions and/or vehicle control instructions to IICS. In some embodiments, a TCU/TCC processes the vehicle sensor information and/or data and/or the roadside infrastructure sensor information and/or data. In some embodiments, a TCU/TCC provides driving decisions and/or vehicle control instructions to IICS. In some embodiments, the IRIS comprises an IRIS communications module, IICS comprises an IICS communications module, and/or CAV comprises a CAV communications module; and the IRIS, IICS, and/or CAV communicate with each other using the IRIS communications module, the IICS communications module, and/or the CAV communications module. In some embodiments, IRIS, IICS, and/or CAV communicate with each other using dedicated short-range communication, 4G cellular communication, 5G cellular communication, and/or 6G cellular communication. In some embodiments, the cache subsystem is configured to cache data received by the IICS. In some embodiments, the power supply subsystem is configured to provide energy to the IICS.

In some embodiments, the IRIS comprises an RIU and the RIU comprises a sensing module; an interaction module; and a communications module. In some embodiments, the sensing module comprises a camera, radar, and other sensors, which collect traffic, and vehicle driving environment information within the road section. In some embodiments, the radar is microwave radar. In some embodiments, the sensing module is configured to collect traffic information and/or vehicle driving environment information. In some embodiments, the interaction module is configured to integrate data from the sensing module and the communication module; and/or to exchange data and/or information with the communication module. In some embodiments, the communications module is configured to receive data and/or information from the interaction module; and/or to exchange data and/or information with a TCU communication module.

In some embodiments, the IRIS comprises a TCU and the TCU comprises a data processing module; and a communication module. In some embodiments, the communications module is configured to exchange data and/or information with the data processing module and/or communication modules of other TCU. In some embodiments, the TCU is a point TCU and/or a segment TCU. In some embodiments, the communications module does not communicate directly with the communication module of IICS. In some embodiments, the data processing module is configured to fuse data received from the communication module and traffic state information to produce fused data; to process fused data; and to make decisions based on the fused data. In some embodiments, the data received from the communication module comprises current traffic control information, vehicle road sensing information from a roadside communication module, and/or information from a TCU. In some embodiments, the traffic state information comprises traffic flow information, traffic speed information, and/or traffic congestion information.

In some embodiments, the IICS is configured to assist CAV at intelligence level V1 or V1.5, wherein an IRIS and the IICS perform information integration and decision-making; and send vehicle control instructions to CAV. In some embodiments, the TCC/TCU receives sensing information from a RIU and a VIU of a CAV, wherein the CAV drives on a road serviced by infrastructure and needing assistance for automated driving from the infrastructure; IRIS makes a decision based on the data and/or information received from IICS describing the road environment, road geometry information, and/or vehicle driving information; and provide control instructions to CAV through the IICS; and CAV performs vehicle control operations according to the control instructions received by IICS. In some embodiments, information from roadside sensors and/or infrastructure supports the decision-making of the TCC/TCU; and the vehicle-end information provides feedback for verifying and/or adjusting future decision-making.

In some embodiments, the IICS is configured to assist CAV at intelligence level V2 or V3, wherein a VIU exchanges information with IICS based on the information requirements of a driving task; and roadside data and/or information provided through IICS supports the VIU to complete a driving task. In some embodiments, the VIU is configured to store roadside data and/or information provided through IICS to increase accumulation of experience data for adapting driving to an increased number of driving environments and scenarios. In some embodiments, the TCC/TCU receives sensing information from a RIU and a VIU of a CAV, wherein the CAV drives on a road serviced by infrastructure and needing assistance for automated driving from the infrastructure; IRIS transmits information and/or data to VIU through IICS; and IRIS and VIU collaborate to provide control instructions to CAV. In some embodiments, the TCC/TCU receives information and/or data from roadside infrastructure and/or and vehicle-end information from IICS. In some embodiments, the vehicle control system operates according to vehicle status information, road geometry information, target object information, and/or the vehicle experience memory. In some embodiments, a vehicle control system collaborates with IRIS to provide operating instructions and/or vehicle control instructions to CAV. In some embodiments, IRIS collaborates with a VIU and/or vehicle on-board control system to provide operating instructions and/or vehicle control instructions to CAV.

In some embodiments, the IICS is configured to assist CAV at intelligence level V4 or above, wherein the IICS transmits roadside sensing information and/or data to a VIU to support the CAV vehicle control system. In some embodiments, TCC/TCU receives sensing information and/or data from a RIU. In some embodiments, TCC/TCU does not receive information and/or data from VIU. In some embodiments, TCC/TCU and the on-board control system sense traffic information and/or driving behavior information independently; and/or vehicle control system receives sensing information from the VIU and roadside sensing information transmitted by IICS, and makes a vehicle control decision independently. In some embodiments, roadside sensing information is transmitted to VIU through IICS; and the roadside sensing information is then transmitted to the on-board control system to support the vehicle control system in providing vehicle control instructions and/or decision information to the execution module.

Also provided herein are methods employing any of the systems described herein for the management of one or more aspects of automated driving of a CAV and/or for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

For example, in some embodiments, methods are performed by an IICS as described herein (e.g., an IICS configured to perform the methods). For example, in some embodiments, the technology provides a method for information exchange between a CAV and IRIS. In some embodiments, methods comprise transmitting vehicle-end information and/or vehicle information demands from a vehicle to an IICS; encoding the vehicle-end information and/or vehicle information demands by the IICS to produce encoded vehicle-end information and/or vehicle information demands; transmitting the encoded vehicle-end information and/or vehicle information demands to IRIS; and parsing the encoded vehicle-end information and/or vehicle information demands by IRIS to produce decoded vehicle-end information and/or vehicle information demands. In some embodiments, transmitting vehicle-end information and/or vehicle information demands from a vehicle to the IICS comprises transmitting the vehicle-end information and/or vehicle information demands from a VIU of the vehicle. In some embodiments, transmitting vehicle-end information and/or vehicle information demands from a vehicle to the IICS comprises transmitting the vehicle-end information and/or vehicle information demands through a connector of the IICS. In some embodiments, vehicle-end information comprises vehicle access verification information, vehicle sensing information and/or data, vehicle control command information, vehicle status information, and/or vehicle driving task execution information. In some embodiments, vehicle information demands comprise one or more information demands in the categories of frequency, safety demand, precision, scope, and/or static or dynamic. In some embodiments, encoded vehicle-end information is encoded in a code book standardized format for information exchange. In some embodiments, transmitting the encoded vehicle-end information to IRIS comprises transmitting the encoded vehicle-end information through a connector of the IICS. In some embodiments, vehicle sensing information and/or data comprises data from vehicle external sensors and/or data from vehicle interior sensors.

In some embodiments, methods further comprise fusing by IRIS the decoded vehicle-end information and/or vehicle information demands with information and/or data from roadside infrastructure to produce fused information; encoding the fused information to produce encoded fused information; transmitting the encoded fused information from IRIS to IICS; decoding by IICS the encoded fused information to produce decoded fused information and/or vehicle information demands; and transmitting the decoded fused information and/or vehicle information demands from IICS to CAV. In some embodiments, transmitting the encoded fused information from IRIS to IICS comprises transmitting the encoded fused information through a connector of the IICS. In some embodiments, transmitting the decoded fused information and/or vehicle information demands from IICS to CAV comprises transmitting the decoded fused information and/or vehicle information demands through a connector of the IICS. In some embodiments, the encoded fused information is encoded in a code book standardized format for information exchange.

In some embodiments, the IICS is configured to perform a method of classifying information based on the frequency of update of the information to assign a value to information category I (frequency) of high frequency, medium frequency, or low frequency. In some embodiments, the IICS is configured to perform a method of classifying information based on the safety demand of the information to assign a value to information category II (safety demand) of high safety demand, medium safety demand, or low safety demand. In some embodiments, the method of classifying information based on the safety demand of the information comprises assessing the importance of the information for decision making, motion planning, and/or control of automated vehicles. In some embodiments, the IICS is configured to perform a method of classifying information based on precision of the information to assign a value to information category III (precision) of high precision, medium precision, or low precision. In some embodiments, the method of classifying information based on precision of the information comprises assessing a driving scenario, driving task, and/or vehicle intelligence level. In some embodiments, the IICS is configured to perform a method of classifying information based on the scope of the information to assign a value to information category IV (scope) of macroscopic, mesoscopic, or microscopic. In some embodiments, macroscopic information comprises road network level information; mesoscopic information comprises road section level information; and/or microscopic information comprises vehicle level information. In some embodiments, the IICS is configured to perform a method of classifying information based on the static or dynamic characteristics of the information to assign a value to information category V (static or dynamic) of static dynamic. In some embodiments, static information comprises information that is unchanged during the operation of the vehicle; and/or dynamic information comprises information that changes during the operation of the vehicle.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet; CAVH, IRIS, or CAH communications; and/or a cellular network). See, e.g., U.S. Pat. App. Pub. No. 20200005633, incorporated herein by reference.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
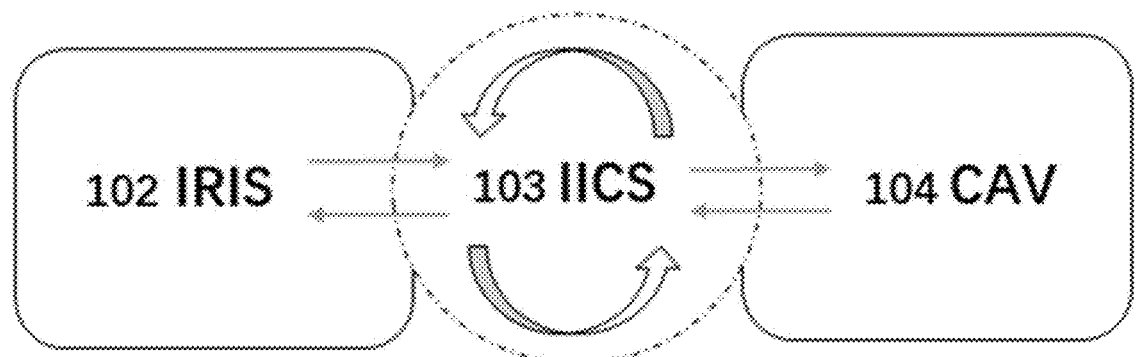
FIG. 1 is a schematic drawing showing an exemplary relationship of CAVH, IRIS, CAV, and IICS. 101, Connected automated vehicle highway systems (CAVH); 102, Intelligent road infrastructure system (IRIS); 103, Intelligent information conversion system (IICS); 104, Connected and automated vehicle (CAV). Coding, decoding, and data flow are indicated by arrows.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to automated driving and particularly, but not exclusively, to an intelligent information conversion system and related methods for providing collaborative automatic driving to intelligent transportation systems, vehicle networking systems, collaborative management control systems, vehicle-road collaborative systems, automated driving systems, and the like.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present" or "absent") is used in a relative sense to describe the amount or level of a particular entity (e.g., component, action, element). For example, when an entity is said to be "present", it means the level or amount of this entity is above a pre-determined threshold; conversely, when an entity is said to be "absent", it means the level or amount of this entity is below a pre-determined threshold. The pre-determined threshold may be the threshold for detectability associated with the particular test used to detect the entity or any other threshold. When an entity is "detected" it is "present"; when an entity is "not detected" it is "absent".

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, the term "number" shall mean one or an integer greater than one (e.g., a plurality).

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods. For example, a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform a function of the system or subsystem. Thus, the methods and apparatus of the embodiments, or certain aspects or portions thereof, may take the form of program code (e.g., instructions) embodied in tangible media, such as floppy diskettes, CD-ROMs, hard drives, flash memory, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (e.g., volatile and non-volatile memory and/or storage elements), at least one input device, and at least one output device. One or more programs may implement or utilize the processes described in connection with the embodiments, e.g., through the use of an application programming interface (API), reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

As used herein, the term "automated driving system" (abbreviated "ADS") refers to a system that performs driving tasks (e.g., lateral and longitudinal control of the vehicle) for a vehicle and thus allows a vehicle to drive with reduced human control of driving tasks and/or without human control of driving tasks.

As used herein, the term "Connected Automated Vehicle Highway System" ("CAVH System") refers to a comprehensive system (e.g., an ADS) providing full vehicle operations and control for connected and automated vehicles (CAV), and, more particularly, to a system controlling CAV by sending individual vehicles with detailed and time-sensitive control instructions for vehicle following, lane changing, route guidance, and related information. A CAVH system comprises sensing, communication, and control components connected through segments and nodes that manage an entire transportation system. CAVH systems comprise four control levels: vehicle; roadside unit (RSU), which, in some embodiments, is similar to or the same as a roadside intelligent unit (RIU); traffic control unit (TCU); and traffic control center (TCC). See U.S. Pat. Nos. 10,380,886; 10,867,512; and/or 10,692,365, each of which is incorporated herein by reference.

As used herein, the term "Intelligent Road Infrastructure System" ("IRIS") refers to a system that facilitates vehicle operations and control for CAVH systems. See U.S. Pat. Nos. 10,867,512 and/or 10,692,365, each of which is incorporated herein by reference. In some embodiments, an IRIS provides transportation management and operations and individual vehicle control for connected and automated vehicles (CAV). For example, in some embodiments, an IRIS provides a system for controlling CAV by sending individual vehicles with customized, detailed, and time-sensitive control instructions and traffic information for automated vehicle driving, such as vehicle following, lane changing, route guidance, and other related information.

As used herein, the term "GPS" refers to a global navigation satellite system (GNSS) that provides geolocation and time information to a receiver. Examples of a GNSS include, but are not limited to, the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference)).

As used herein, the term "allocate", "allocating", and similar terms referring to resource distribution also include distributing, arranging, providing, managing, assigning, controlling, and/or coordinating resources.

As used herein, the term "resource" refers to computational capacity (e.g., computational power, computational cycles, etc.); memory and/or data storage capacity; sensing capacity; communications capacity (e.g., bandwidth, signal strength, signal fidelity, etc.); and/or electrical power.

As used herein, the term "service" refers to a process, a function that performs a process, and/or to a component or module that is configured to provide a function that performs a process.

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside intelligent units (RIU), traffic control signals, and/or other infrastructure (e.g., an ADS or component thereof) or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "support" when used in reference to one or more components of an ADS, CAVH, CAV, and/or a vehicle providing support to and/or supporting one or more other components of the ADS, CAVH, CAV, and/or a vehicle refers to, e.g., exchange of information and/or data between components and/or levels of the ADS, CAVH, CAV, and/or a vehicles; sending and/or receiving instructions between components and/or levels of the ADS, CAVH, CAV, and/or a vehicles; and/or other interaction between components and/or levels of the ADS, CAVH, CAV, and/or a vehicles that provide functions such as information exchange, data transfer, messaging, and/or alerting.

As used herein, the term "ADS component" or "component of an ADS" refers individually and/or collectively to one or more of components of an ADS and/or a CAVH system, e.g., a VIU, RIU, TCC, TCU, TCC/TCU, TOC, CAV, a supporting subsystem, and/or a cloud component.

As used herein, the term "roadside intelligent unit" (abbreviated "RIU") may refer to one RIU, a plurality of RIU, and/or a network of RIU.

As used herein, the term "critical point" refers to a portion or region of a road that is identified as appropriate to be provided embodiments of the function allocation technology provided herein. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a day, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the terms "microscopic", "mesoscopic", and "macroscopic" refer to relative scales in time and space. In some embodiments, the scales include, but are not limited to, a microscopic level relating to individual vehicles (e.g., longitudinal movements (car following, acceleration and deceleration, stopping and standing) and lateral movements (lane keeping, lane changing)), a mesoscopic level relating to road corridors and/or segments (e.g., special event early notification, incident prediction, merging and diverging, platoon splitting and integrating, variable speed limit prediction and reaction, segment travel time prediction, and/or segment traffic flow prediction), and a macroscopic level relating to an entire road network (e.g., prediction of potential congestion, prediction of potential incidents, prediction of network traffic demand, prediction of network status, prediction of network travel time). In some embodiments, a time scale at a microscopic level is from 1 to 10 milliseconds and is relevant to tasks such as vehicle control instruction computation. In some embodiments, a time scale at a mesoscopic level is typically from 10 to 1000 milliseconds and is relevant to tasks such as incident detection and pavement condition notification. In some embodiments, a time scale at a macroscopic level is longer than 1 second and is relevant to tasks such as route computing.

As used herein, the automation and/or intelligence levels of vehicles (V), infrastructure (I), and system (S) are described with respect to an "intelligence level" and/or an "automation level".

For example, in some embodiments, the intelligence and/or automation level of a vehicle (e.g., a CAV) is defined according to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), each of which is incorporated herein by reference. For example, in some embodiments, the intelligence and/or automation level of a vehicle (e.g., a CAV) is defined as one of the following: V0: No automation functions (e.g., "manual driving"); V1: Basic functions to assist a human driver to control a vehicle (e.g., "assisted driving"); V2: Functions to assist a human driver to control a vehicle for simple tasks and to provide basic sensing functions (e.g., "partially autonomous driving"); V3: Functions to sense the environment in detail and in real-time and to complete relatively complicated driving tasks (e.g., "conditional autonomous driving"); V4: Functions to allow vehicles to drive independently under limited conditions and sometimes with human driver backup (e.g., "highly autonomous driving"); and V5: Functions to allow vehicles to drive independently without human driver backup under all conditions (e.g., "fully autonomous driving"). As used herein, a vehicle having an intelligence level of 1.5 (V1.5) refers to a vehicle having capabilities between vehicle intelligence 1 and vehicle intelligence level 2, e.g., a vehicle at V1.5 has minimal or no automated driving capability but comprises capabilities and/or functions (e.g., hardware and/or software) that provide control of the V1.5 vehicle by a CAVH system (e.g., the vehicle has "enhanced driver assistance" or "driver assistance plus" capability).

In some embodiments, the classification of infrastructure (e.g., Intelligent Road Infrastructure System (IRIS)) is defined according to informatization (e.g., capabilities and functions related to digitalization and/or networking), intelligence (e.g., capabilities and functions related to traffic operation and/or management), automation (e.g., capabilities and functions related to assisted driving and/or autonomous driving), application scenarios (e.g., capabilities related to functional effectiveness and efficiency in terms of time and/or space), capabilities and functions related to management of mixed traffic comprising vehicles having a range of automation levels, and/or safety (e.g., capabilities and functions related to safety warning, avoidance, and/or collision avoidance).

In some embodiments, the infrastructure intelligence and/or automation level is one of the following: I0: No functions (e.g., "non-informatization" and/or "non-intelligence" and/or "non-automation"); I1: Information collection and traffic management wherein the infrastructure provides primitive sensing functions in terms of aggregated traffic data collection and basic planning and decision making to support simple traffic management at low spatial and temporal resolution (e.g., "preliminary digitization" and/or "preliminary intelligence" and/or "preliminary automation"); I2: I2X and vehicle guidance for driving assistance, wherein, in addition to functions provided in I1, the infrastructure realizes limited sensing functions for pavement condition detection and vehicle kinematics detection, such as lateral and/or longitudinal position, speed, and/or acceleration, for a portion of traffic, in seconds or minutes; the infrastructure also provides traffic information and vehicle control suggestions and instructions for the vehicle through I2X communication (e.g., "partial networking" and/or "partial intelligence" and/or "partial automation"); I3: Dedicated lane automation, wherein the infrastructure provides individual vehicles with information describing the dynamics of surrounding vehicles and other objects on a millisecond time scale and supports full automated driving on CAVH-compatible vehicle dedicated lanes; the infrastructure has limited transportation behavior prediction capability (e.g., "conditional autonomous driving" and/or "highly networked driving based on road infrastructure"); I4: Scenario-specific automaton wherein the infrastructure provides detailed driving instructions for vehicles to realize full automated driving in certain scenarios and/or areas, such as locations comprising predefined geo-fenced areas, where the traffic is mixed (e.g., comprises automated and non-automated vehicles); essential vehicle-based automation capability, such as emergency braking, is provided as a backup system in case the infrastructure fails (e.g., "highly autonomous driving based on road infrastructure"); and I5: Full infrastructure automation wherein the infrastructure provides full control and management of individual vehicles under all scenarios and optimizes a whole road network where the infrastructure is deployed; vehicle automation functionality is not necessary provided as a backup; full active safety functions are available (e.g., "fully autonomous driving based on road infrastructure").

In some embodiments, the system intelligence and/or automation level is one of the following: S0: no function (e.g., "non-informatization" and/or "non-intelligence" and/or "non-collaboration" and/or "non-integration"); S1: the system provides simple functions for individual vehicles such as cruise control and passive safety function; the system detects the vehicle speed, location, and distance (e.g., "preliminary informatization" and/or "preliminary intelligence" and/or "preliminary collaboration" and/or "preliminary integration"); S2: the system comprises individual intelligence and detects vehicle functioning status, vehicle acceleration, and/or traffic signs and signals; individual vehicles make decisions based on their own information and have partially automated driving to provide complicated functions such as assisting vehicle adaptive cruise control, lane keeping, lane changing, and automatic parking (e.g., "partial informatization" and/or "partial intelligence" and/or "partial collaboration" and/or "partial integration"); S3: the system integrates information from a group of vehicles and behaves with ad-hoc intelligence and prediction capability, the system has intelligence for decision making for the group of vehicles and can complete complicated conditional automated driving tasks such as cooperative cruise control, vehicle platooning, vehicle navigation through intersections, merging, and diverging (e.g., "high informatization" and/or "high intelligence" and/or "high collaboration" and/or "conditional system integration"); S4: the system integrates driving behavior optimally within a partial network; the system detects and communicates detailed information within the partial network and makes decisions based on both vehicle and transportation information within the network and handles complicated, high level automated driving tasks, such as navigating traffic signal corridors, and provides optimal trajectories for vehicles within a small transportation network (e.g., "full informatization" and/or "full intelligence" and/or "full collaboration" and/or "high degree of system integration"); S5: vehicle automation and system traffic automation, wherein the system optimally manages an entire transportation network; the system detects and communicates detailed information within the transportation network and makes decisions based on all available information within the network; the system handles full automated driving tasks, including individual vehicle tasks and transportation tasks, and coordinates all vehicles to manage traffic (e.g., "full informatization" and/or "full intelligence" and/or "full collaboration" and/or "full system integration"). In some embodiments, the system dimension is dependent on the vehicle and infrastructure dimensions, e.g., as represented by the following equation (S=system automation; V=vehicle intelligence; and I=infrastructure intelligence):

$$S=f(V,I)$$

In some embodiments, vehicle intelligence is provided by and/or related to the CAV Subsystem and the infrastructure intelligence is provided by and/or related to the CAH Subsystem. One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

DESCRIPTION

Figure 2:
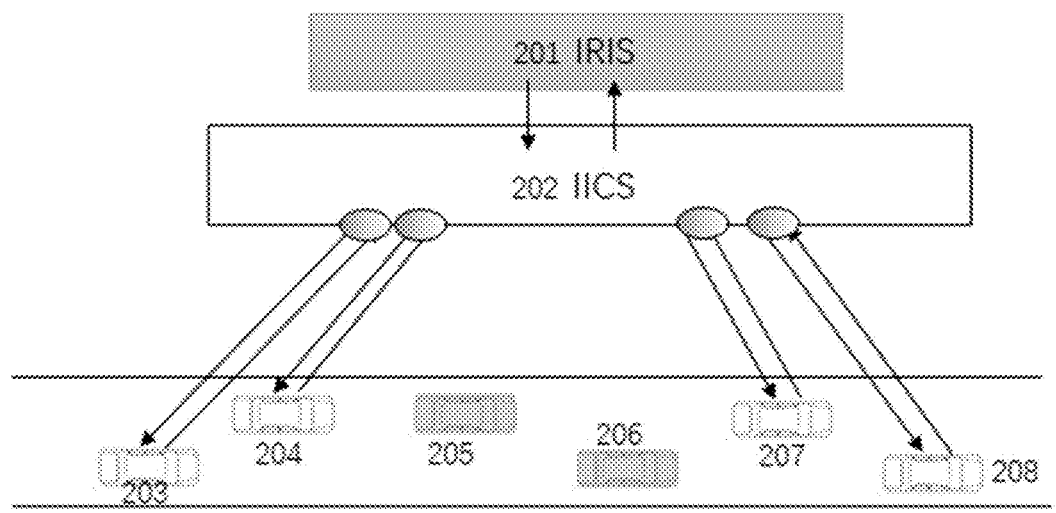
FIG. 2 is a schematic drawing showing an exemplary structure of a system comprising IRIS, CAVs, and IICS. 201, Intelligent road infrastructure system (IRIS); 202, Intelligent information conversion system (IICS); 203, CAV (e.g., V1.5 CAV), which connects to IRIS; 204, CAV (e.g., V2 CAV), which connects to IRIS. 205, CAV (e.g., V1.5 CAV), which does not connect to IRIS; 206, CAV (e.g., V2 CAV), which does not connect to IRIS; 207, CAV (e.g., V3 CAV), which connects to IRIS; 208, CAV (e.g., V4 CAV), which connects to IRIS. Connections of CAV with IRIS (e.g., through the IICS) are shown by arrows.
Figure 3:
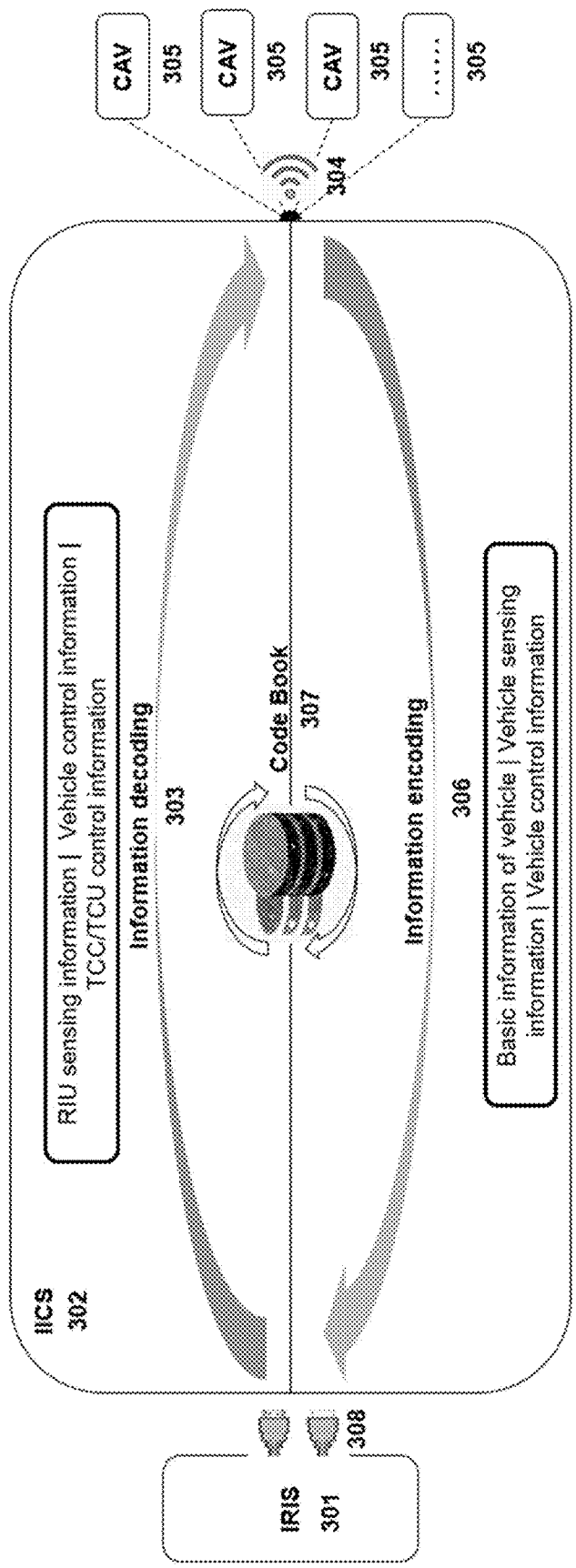
FIG. 3 is a drawing showing an exemplary overall structure of the IICS and shows exemplary interactions of the IICS with IRIS and CAV. 301, Intelligent road infrastructure system (IRIS); 302, Intelligent information conversion system (IICS); 303, Information decoding; 304, Connection (e.g., communication and/or data flow) between IICS and CAV; 305, Connected and automated vehicle; 306, Information encoding; 307, Code Book; 308, Connection (e.g., communication and/or data flow) between IICS and IRIS.

The technology described herein provides an Intelligent Information Conversion System (IICS) and related methods. In some embodiments, e.g., as shown in FIGS. 1-3, the IICS facilitates communication between intelligent road infrastructure (e.g., IRIS) and vehicles (e.g., CAV) at a range of intelligence levels (e.g., V1, V1.5, V2, V3, and V4) in automatic driving systems (ADS). Accordingly, the IICS improves the service level of ADS and/or provides functions and support to meet the autonomous driving requirements for systems comprising CAV and ADS. In some embodiments, the IICS provides real-time dynamic information exchange between intelligent road infrastructure (e.g., IRIS) and vehicles (e.g., CAV) at a range of intelligence levels (e.g., V1, V1.5, V2, V3, and V4) in automatic driving systems (ADS). In some embodiments, the IICS comprises a code book, a coding module, a connector module, and a supporting system. In some embodiments, the code book provides information sorting, the coding module provides encoding and decoding functions encode and/or decode information using the code book (e.g., using tables, translation tools, and other information provided by the code book). In some embodiments, the connector module comprises a roadside connector and/or a vehicle-end connector. In some embodiments, the supporting system comprises a cache system and/or a power supply system. In some embodiments, the IICS provides systems and methods configured to provide service for different levels of ADS. In some embodiments, the IICS is configured to be integrated into the IRIS and/or a cloud platform.

Code Book and Code Book Information Standard

In some embodiments, e.g., as shown in FIG. 3, the IICS technology provided herein comprises and/or provides a "code book". In some embodiments, the code book provides an information standard for encoding information transmitted to and/or from an ADS. In some embodiments, the code book provides an information standard for encoding information transmitted to and/or from a CAV. Accordingly, in some embodiments, the code book provides a standard for communicating information between different CAV and/or between different ADS that each may have information coding schemes specific for the CAV and/or ADS. Thus, in some embodiments, the code book provides an intermediate (e.g., universal) standard for information exchange between any CAV and any ADS.

In some embodiments, a code book string comprises a series of integers representing specific information about a CAV, road infrastructure, and/or information. In some embodiments, a code book string comprises an ordered series of integers (e.g., 16 integers ordered from left to right) representing a number of categories of information (e.g., 16 categories of information), wherein the position (e.g., position 1, 2, 3, 4, 5, 6, 7, 8, 9, 10, 11, 12, 13, 14, 15, or 16 from left to right) of the integer within the code book string indicates the category of information represented by the integer and the value of each integer represents a specific value for a (e.g., each) category.

Accordingly, in some embodiments, a code book string comprises a sequence (e.g., an ordered sequence) of integers to represent specific categories of information describing a CAV, the road and/or infrastructure with which the CAV interacts and from which the CAV receives support for automated driving, and/or information exchanged between a CAV and/or infrastructure. For example, in some embodiments, a code book string comprises a plurality of integers (e.g., an ordered sequence of integers) describing the categories of: e.g., vehicle automation level, vehicle original equipment manufacturer (OEM), vehicle brand, vehicle model year, vehicle type, road category, highway level, urban road level, road intelligence level; information function level (sensing, forecasting, decision-making, and control, etc.); and/or describing the six information categories of information category I (frequency), information category II (safety demand), information category III (precision), information category IV (scope), information category V (static and dynamic), and/or information category VI (name).

In some embodiments, a code book string comprises a string of integers (e.g., 16 integers in the order of categories specified above) and represents a specific message and/or information. In some embodiments, each category has a number of values represented by an integer (e.g., 0, 1, 2, 3, 4, 5, 6, 7, 8, 9, . . . , N). Accordingly, the position of the integer in the code book string (e.g., position 1, 2, 3, 4, 5, 6, 7, 8, 9, 10, 11, 12, 13, 14, 15, or 16) indicates the category of the information represented by the integer and the value of the integer at each position (e.g., 0, 1, 2, 3, 4, 5, 6, 7, 8, 9, . . . , N) represents the specific value for the category.

For example, in some embodiments, the vehicle automation level category may have a value of V0, V1, V2, V3, V4, or V5 that is represented by the integers 0, 1, 2, 3, 4, or 5, respectively. As another example, the category vehicle OEM may have a value of factory 1, factory 2, . . . , or factory N that is represented by the integers 1, 2, . . . , or N, respectively. In particular, in some embodiments, the 16 categories of data provided by a code book string and the values and integers representing each value for each of the 16 categories are provided in Table 1.

TABLE 1

Code book string categories, values, and integers

| Code book string integer position | Code book information category | Values of the code book information category | Integers representing values of the code book information category |
| --- | --- | --- | --- |
| 1 | Vehicle automation level | V0, V1, V2, V3, V4, or V5 | 1, 2, 3, 4, or 5, respectively |
| 2 | Vehicle OEM | factory 1, factory 2, . . . , or factory N | 1, 2, . . ., or N, respectively |
| 3 | Vehicle brand | brand 1, brand 2, . . . , or brand N | 1, 2, . . ., or N, respectively |
| 4 | Vehicle type | car, bus, truck, . . . , or vehicle type N | 1, 2, 3, . . ., or N, respectively |
| 5 | Road category | highway or urban road | 1 or 2, respectively |
| 6 | Highway level | expressway, first-class highway, second-class highway, third-class highway, or fourth-class highway | 0, 1, 2, 3, or 4, respectively |
| 7 | Urban road level | urban expressway, major arterial, minor arterial, or collector road | 0, 1, 2, or 3, respectively |
| 8 | Road (infrastructure) intelligence level | I0, I1, I2, I3, I4, or I5 | 1, 2, 3, 4, or 5, respectively |
| 9 | Information function type | sensing, forecasting, decision-making, or vehicle control | 0, 1, 2, or 3, respectively |
| 10 | Information category I (frequency) | high frequency, medium frequency, or low frequency | 0, 1, or 2, respectively |
| 11 | Information category II (safety demand) | high safety demand, medium safety demand, or low safety demand | 0, 1, or 2, respectively |
| 12 | Information category III (precision) | high precision, medium precision, or low precision | 0, 1, or 2, respectively |
| 13 | Information category IV (scope) | network level, road segment level, or vehicle level | 0, 1, or 2, respectively |
| 14 | Information category V (static or dynamic) | static or dynamic | 0 or 1, respectively |
| 15 | Information category VI (name) | name 1, name 2, . . . , or name N | 1, 2, . . ., or N |

In some embodiments, code book strings are sorted and/or filtered according to one or more values at one or more code book string positions. For example, in some embodiments, the technology provides systems and methods for sorting a code book string using information category I (frequency). In particular, the code book string category information category (I) relates to the frequency that the information represented by the code book string changes. In some embodiments, a service section information, toll station information, a lane width, a road sign meaning, and/or a road curvature are categorized as low frequency information. In addition, in some embodiments, road condition, vehicle spacing and headway, relative distance, relative speed, lateral deviation, and/or longitudinal deviation are categorized as high frequency information.

In some embodiments, the technology provides systems and methods for sorting a code book string using information category II (safety demand). In particular, the code book string category information category II (safety demand) relates to the degree of importance of the information for decision making, vehicle control, and motion planning of CAV for automated driving. In some embodiments, lateral distance, longitudinal headway, lateral deviation, longitudinal deviation, relative distance, and/or relative velocity are categorized as high safety demand information. In some embodiments, ramp information, service section information, toll station information, dedicated lane information, toll lane information, HOV lane information, a number of lanes, a lane width, and/or a traffic sign are categorized as low safety demand.

In some embodiments, information relating to a vehicle is categorized as high frequency, medium frequency, or low frequency information and/or as high safety demand, medium safety demand, or low safety demand information according to the frequency and safety demand level, e.g., as described in Table 2.

TABLE 2

Vehicle information categorized by frequency and safety demand

| | High Frequency | Medium Frequency | Low Frequency |
|---|---|---|---|
| High Safety Demand | Information for an individual vehicle describing lateral distance, longitudinal headway, lateral deviation, longitudinal deviation, relative distance, relative velocity | Information for an individual vehicle describing velocity, position, road control, engine torque control, braking-stable acceleration, start-stop control, throttle force | Information describing pedestrians and other traffic participants around an individual vehicle |
| Medium Safety Demand | Information describing the road conditions for an individual vehicle | Information describing road obstacles and/or right of way distribution around an individual vehicle | Traffic accident, trajectory planning, weather information |
| Low Safety Demand | Information relating to the effective tracking of a target (e.g., vehicle, surrounding vehicle, object, etc.) | Ramp information, service section information, toll station information, dedicated lane, HOV lane | Road infrastructure, road curvature, number of lanes and lane width, traffic sign |

In some embodiments, information relating to road infrastructure or conditions is categorized as high frequency, medium frequency, or low frequency information and/or as high safety demand, medium safety demand, or low safety demand information according to the frequency and safety demand level, e.g., as described in Table 3.

TABLE 3

Road information categorized by frequency and safety demand

| | High Frequency | Medium Frequency | Low Frequency |
|---|---|---|---|
| High Safety Demand | Road condition, road obstacle, vehicle control command (e.g., throttle force, braking force, and/or steering wheel adjustment angle) | Road average speed, average headway, congestion status, driving environment, brightness information, traffic event information | Road infrastructure |
| Medium Safety Demand | Traffic control information | Road average speed | Vehicle condition information |
| Low Safety Demand | | Weather information | Trajectory information, road network information |

In some embodiments, the technology provides systems and methods for sorting a code book string using information category III (precision). In particular, the code book string category information category III (precision) relates to driving scenarios, driving tasks, and/or vehicle intelligence levels. For example, in some embodiments, a tracking target, collision residual time, lateral deviation, longitudinal deviation, and/or velocity information are categorized as high precision level information. In some embodiments, the number of lanes, lane width, weather information, ramp information, and service section information are categorized as low precision information.

In some embodiments, the technology provides systems and methods for sorting a code book string using information category IV (scope). In particular, the code book string category information category IV relates to a spatial scale. For example, in some embodiments, road network level information, (e.g., road condition, traffic accident information, road sign meaning, obstacle information, number of lanes, lane width, weather information, and/or map information) is categorized as macroscopic information. In some embodiments, road section level information (e.g., road section average speed and/or road section average volume) is categorized as mesoscopic information. In some embodiments, vehicle level information (e.g., information for effectively tracking a target (e.g., an individual vehicle, surrounding vehicles, objects)), time to collision, vehicle identity and/or identifier, individual vehicle speed, individual vehicle relative distance, individual vehicle relative speed, individual vehicle lateral deviation, individual vehicle longitudinal deviation, individual vehicle engine torque control, individual vehicle braking stable acceleration, individual vehicle start-stop control, and/or throttle force) is categorized as microscopic information.

In some embodiments, vehicle information is classified according to precision (high precision, medium precision, or low precision) and/or scope (network level, road section level, or vehicle level), e.g., as described in Table 4.

TABLE 4

Vehicle information categorized by precision and scope

|  | High Precision | Medium Precision | Low Precision |
|---|---|---|---|
| Road Network Level (macroscopic) | Road condition, traffic accident information, road sign meaning, road curvature, lane command information, road obstacle information | Inter-vehicle spacing, individual position, individual velocity, target vehicle velocity, target vehicle position, relative distance, relative velocity, lateral deviation, longitudinal deviation, surrounding pedestrian position, speed information, meaning of traffic sign, engine torque control, braking stable acceleration, start stop control, throttle force | Number of lanes, lane width, weather, road infrastructure, ramp information, service section information, toll station information, exclusive lane, toll lane information, HOV lane information |
| Road Section Level (mesoscopic) | Road section average speed | engine torque control, braking stable acceleration, start stop control, throttle force | Number of lanes, lane width, weather information, road infrastructure, ramp information, service section information, toll station information, exclusive lane, toll lane information, HOV lane information |
| Vehicle Level (microscopic) | Inter-vehicle spacing, individual position, individual velocity, target vehicle velocity, target vehicle position, relative distance, relative velocity, lateral deviation, longitudinal deviation, surrounding pedestrian position, speed information, meaning of traffic sign, engine torque control, braking stable acceleration, start-stop control, throttle force | Road condition, traffic accident, road sign meaning, road curvature, lane command information, road obstacle | Number of lanes, lane width, weather, road infrastructure, ramp, service section, toll station, exclusive lane, toll lane, HOV lane |

In some embodiments, information relating to road infrastructure or conditions is categorized according to precision (high precision, medium precision, or low precision) and/or scope (network level, road section level, or vehicle level), e.g., as described in Table 5.

TABLE 5

Road information categorized by precision and scope

|  | High Precision | Medium Precision | Low Precision |
|---|---|---|---|
| Road Network Level (macroscopic) | Vehicle condition information (vehicle identity and/or identifier, vehicle intelligence level) | Road average speed, average headway, congestion status, driving environment, brightness information, traffic event information, road condition, weather information, road infrastructure, ramp information, throttle force, braking force, steering wheel adjustment angle | Number of ramps, service section information, HOV lane information, etc. |
| Road Section Level (mesoscopic) | Vehicle condition information (vehicle identity and/or identifier, vehicle intelligence level), traffic control information (variable speed limit) | throttle force, braking force, steering wheel adjustment angle | Number of ramps, service sections, HOV lanes, etc. |
| Vehicle Level (microscopic) | Vehicle condition information (vehicle identity and/or identifier, vehicle intelligence level), trajectory planning, throttle force, braking force, steering wheel adjustment angle | Network information | Number of ramps, service section, HOV lane etc. |

In some embodiments, the technology provides systems and methods for sorting a code book string using information category V (static or dynamic). In particular, the code book string category information category V relates to information that is unchanged during vehicle operation (static information) or to information that changes during vehicle operation (dynamic information). For example, in some embodiments, service section location, number of lanes, lane width, HOV lane location, vehicle condition information (e.g., vehicle class, vehicle identity and/or identifier, etc.), road alignment, speed bump, insulating joist, safety guards, anti-dazzle plate, traffic markings and signs, and/or ramp location is categorized as static information. In some embodiments, average road speed, average headway, congestion status, weather information, traffic control information, trajectory planning, road network information, and/or throttle strength is categorized as dynamic information.

In some embodiments, vehicle information is classified according to being static or dynamic (e.g., temporally changing or unchanging) and/or function level (sensing information, prediction information, decision-making information, or control information), e.g., as provided in Table 6.

TABLE 6

Vehicle information categorized as static or dynamic and by function level

| | Static Information | Dynamic Information |
|---|---|---|
| Sensing | Weather information, road condition, road infrastructure, ramp, road obstacle, service section, toll station, road sign meaning, number of lanes, lane width, dedicated lane, toll lane, HOV lane, road curvature, road sign meaning | Inter-vehicle spacing, individual position, individual velocity, target vehicle velocity, target vehicle position, relative distance, relative velocity, lateral deviation, longitudinal deviation, surrounding pedestrian position, speed information, meaning of traffic sign |
| Prediction | | Long term and short term prediction of vehicle trajectory |
| Decision-Making | | Information relating to effectively tracking a target, longitudinal safety, collision residual time, lateral safety, lateral vehicle cut-in factor, origin and/or destination, collision-free optimal path, right of way distribution |
| Control | | Throttle force, braking force, steering wheel adjustment angle |

In some embodiments, road information is classified according to being static or dynamic (e.g., temporally changing or unchanging) and/or function level (sensing information, prediction information, decision-making information, or control information), e.g., as provided in Table 7.

TABLE 7

Road information categorized as static or dynamic and by function level

| | Static Information | Dynamic Information |
|---|---|---|
| Sensing | Vehicle condition information (including vehicle identity and/or identifier, vehicle intelligence level), weather, road condition, road infrastructure, ramp | Road average speed, average headways, congestion status, weather information, driving environment brightness information, traffic event information |
| Prediction | | Traffic control information (variable speed limit etc.), average speed |
| Decision-Making | | Trajectory planning, network information |
| Control | | Throttle force, braking force, steering wheel adjustment angle |

In some embodiments, vehicle and/or road information has a value for information category VI (name). In some embodiments, the value of information category VI (name) is a name describing the information, an identifier and/or descriptor of information, e.g., vehicle speed, vehicle position, etc. In some embodiments, the value of category VI (name) is a value that is not provided by one of the other 15 categories encoded by the first 15 integers of a code book string. In some embodiments, the technology provides systems and methods for sorting a code book string using information category VI (name).

In some embodiments, the IICS connects IRIS and CAV of any intelligence level in automatic driving systems (ADSs) to improve the service level of ADS and to meet different automatic driving requirements for various CAV and ADS. In some embodiments, the IICS provides real-time dynamic information interaction between IRIS and vehicles. In some embodiments, the IICS comprises a code book and provides a function for code book string information sorting; a coding module configured to provide encoding and decoding functions for converting information from CAV and/or ADS to and from the code book standardized format for information exchange; a connector module comprising a roadside connector and the vehicle-end connector; and a supporting system comprising a cache system and a power supply system. In some embodiments, the supporting system comprises a cache system and a power consumption system. In some embodiments, the cache system is configured to cache data transmitted to the system and, in some embodiments, the power supply system provides the energy required for the operation of the entire system. In some embodiments, the IICS comprises systems and methods configured to provide automated driving service for any intelligence level of ADS. In some embodiments, the IICS is configured to integrate into an IRIS and/or a cloud platform.

In some embodiments, the code book standardized format for information exchange comprises a sequence of numbers corresponding to categories of vehicle automation level, original equipment manufacturer, vehicle brand, vehicle model year, vehicle type, road category, highway level, urban road level, road intelligence level, information function level, information category I (frequency), information category II (safety demand), information category III (precision), information category IV (scope), information category V (static and dynamic), and information category VI (name).

In some embodiments, the coding module provides and/or facilitates real-time dynamic information exchange between the vehicle end (e.g., CAV of any intelligence level) and the road end (e.g., road sections equipped with IRIS), wherein the coding module encodes information from CAV to IRIS and decodes information from IRIS to CAV using the code book standardized format for information exchange.

In some embodiments, when a CAV is driving on a road section serviced by IRIS, a VIU of the CAV transmits vehicle end information and the information demands to the IICS through the connector. Thus, the VIU provides information transmission between CAV and the IICS. The vehicle end information comprises basic vehicle information (e.g., for access verification), vehicle sensing information (e.g., for information fusion), vehicle current control command information (e.g., for vehicle road collaborative sensing and control), and vehicle driving task execution information (e.g., for vehicle driving command optimization). The IICS encodes the received information and then transmits the encoded information to IRIS through the connector to provide information interaction from the vehicle end to the road end.

Next, after receiving the encoded information through the connector, IRIS extracts the personalized information from the vehicle end by parsing the integers and positions of integers in the code book string and fuses roadside information (e.g., detected by the IRIS) with the vehicle end information encoded by the IICS and received by IRIS from the IICS connector. The fused information (e.g., encoded into a code book string formatted using the code book standardized format for information exchange) is transmitted by IRIS to the IICS through the IICS connector. The IICS decodes the fused information according to the code book standardized format for information exchange to extract personalized information (e.g., vehicle intelligence level, OEM, vehicle brand, vehicle model year, vehicle type, etc.) and the information demands (e.g., frequency, safety demand, precision, scope, and/or static or dynamic. Then, IICS transmits the decoded information to CAV through the IICS connector, thus responding to the information demand from the vehicle end and providing information exchange from the road end to the vehicle end.

Figure 5:
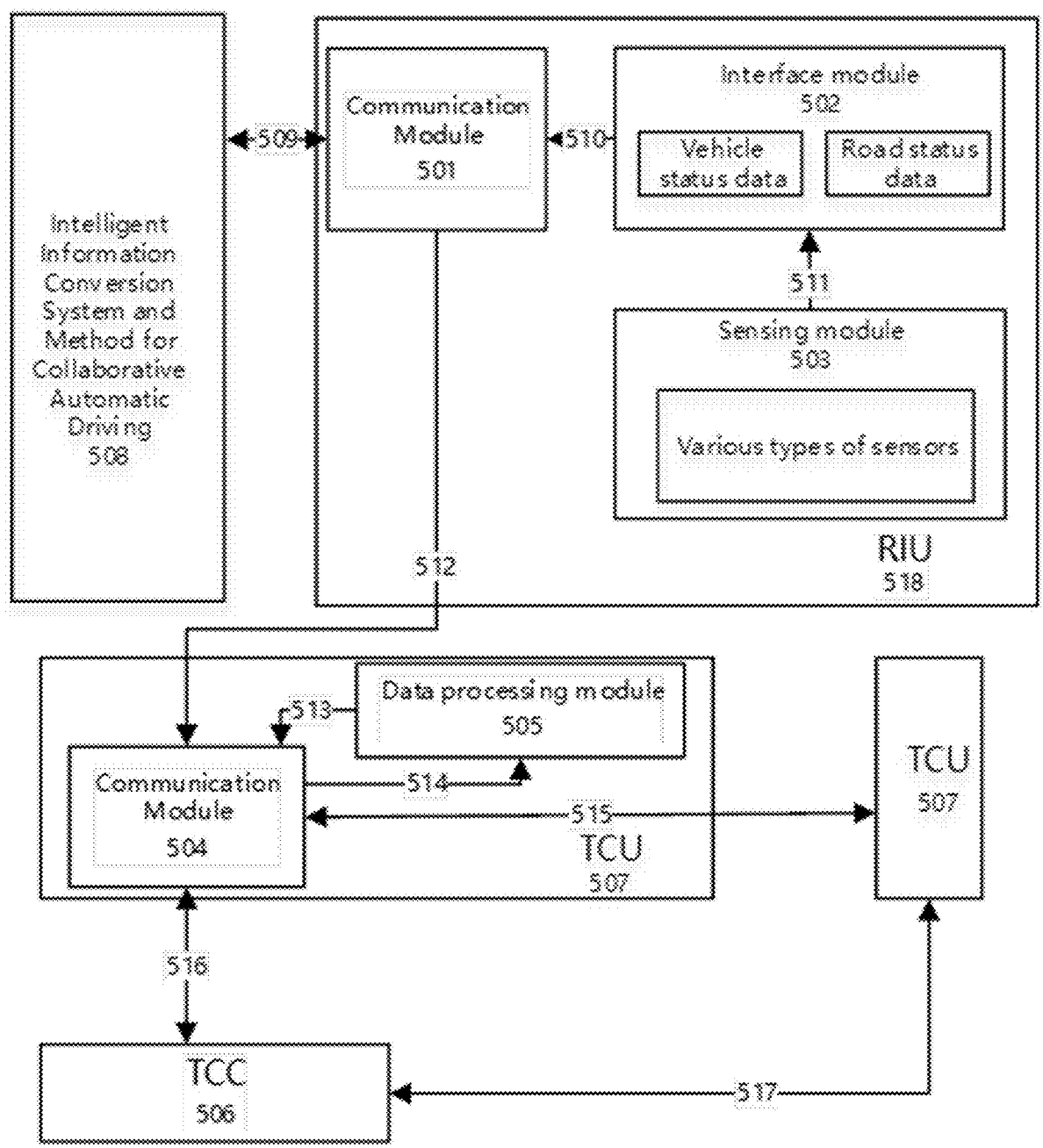
FIG. 5 is a schematic drawing showing an exemplary IRIS and IRIS data flows. 501, Communication module of RIU; 502, RIU Interface module; 503, RIU Sensing module; 504, TCU Communication module; 505, TCU Data processing module; 506, TCC; 507, TCU; 508, Intelligent Information Conversion System and Method for Collaborative Automatic Driving; 509, Data flow between RIU Communication module and IICS; 510, Data flow from RIU Interface module to RIU Communication module; 511, Data flow from RIU Sensing module to RIU Interface module; 512, Data flow from RIU Communication module to TCU Communication module; 513, Data flow from TCU Data processing module to TCU Communication module; 514, Data flow from TCU Communication module to TCU Data processing module; 515, Data flow between a first TCU (e.g., Communication module of the first TCU) and a second TCU; 516, Data flow between a first TCU (e.g., Communication module of the first TCU) and TCC; 517, Data flow between a second TCU and TCC; 518, RIU.

As described below, in some embodiments, the technology relates to an intelligent information conversion system (IICS) for an intelligent road infrastructure, e.g., an Intelligent Road Infrastructure System (IRIS) (e.g., as described in U.S. Pat. Nos. 10,867,512 and/or 10,692,365, each of which is incorporated herein by reference). In some embodiments, the IRIS has a hierarchical structure comprising a number of RIU (e.g., configured to receive vehicle-side information from IICS and perform data exchange with a TCU); a number of TCU (e.g., configured to interact with RIU, other TCU, cloud, and/or TCC (e.g., a cloud TCC) for information exchange; and to perform data fusion and processing); and/or a TCC (e.g., a cloud TCC) (e.g., configured to perform decision-making (e.g., traffic control)) and data storage. See, e.g., FIG. 5.

In some embodiments, the RIU comprises a sensing module (e.g., comprising a camera, a radar (e.g., microwave radar), and/or other sensors) configured to collect traffic and/or vehicle driving environment information within the road section; an interaction (e.g., exchange) module (e.g., configured to integrate data from the sensing module and the communication module and/or to send data to the communication module); a communication module (e.g., configured to receive data from the interaction module and/or to exchange data with the TCU communication module). See, e.g., FIG. 5.

In some embodiments, the TCU comprises a data processing module (e.g., configured to fuse data received from the TCU communication module (e.g., traffic control information, vehicle road sensing information (e.g., received from the roadside communication module), information from other TCU, and traffic state information (e.g., traffic flow, speed, and/or congestion)); and/or configured to process fused data and make decisions using the fused data); and/or a communication module (e.g., configured to exchange data with the data processing module and/or communication modules of other TCU (e.g., point and/or segment TCU)). In some embodiments, the TCU communication module does not directly communicate with the communication module of IICS. See, e.g., FIG. 5.

In some embodiments, CAV comprise a vehicle-end connector comprising an environment sensing module (e.g., configured to sense the surrounding environment of the CAV and to interact with and collect data from various sensors); an internal environment sensing module (e.g., configured to sense the working conditions of the CAV and to interact with and collect data from various sensors); a cognitive module (e.g., configured to collect semantic information and/or cognitive information around the vehicle using integrated sensor information and roadside information from IICS (e.g., driving area, obstacle types and locations, and driving trajectories)); a decision-making module (e.g., configured to provide control decisions (e.g., using previous data stored in the vehicle control system; machine learning based on previous experience; and/or a direct mapping relationship of the information and/or instructions obtained from the roadside infrastructure by the IICS to an intelligent vehicle control quantity)). In some embodiments, the CAV comprise a vehicle-end connector configured to perform and/or support sensing the environment around the CAV, e.g., wherein CAV sensors sense the surrounding environment of the CAV and an environment sensing fusion module integrates CAV sensor data with roadside information and/or sensor data from IICS to recognize and/or characterize the environment around the CAV and/or scene information around the CAV; and/or to predict the trajectory of the CAV.

Figure 6:
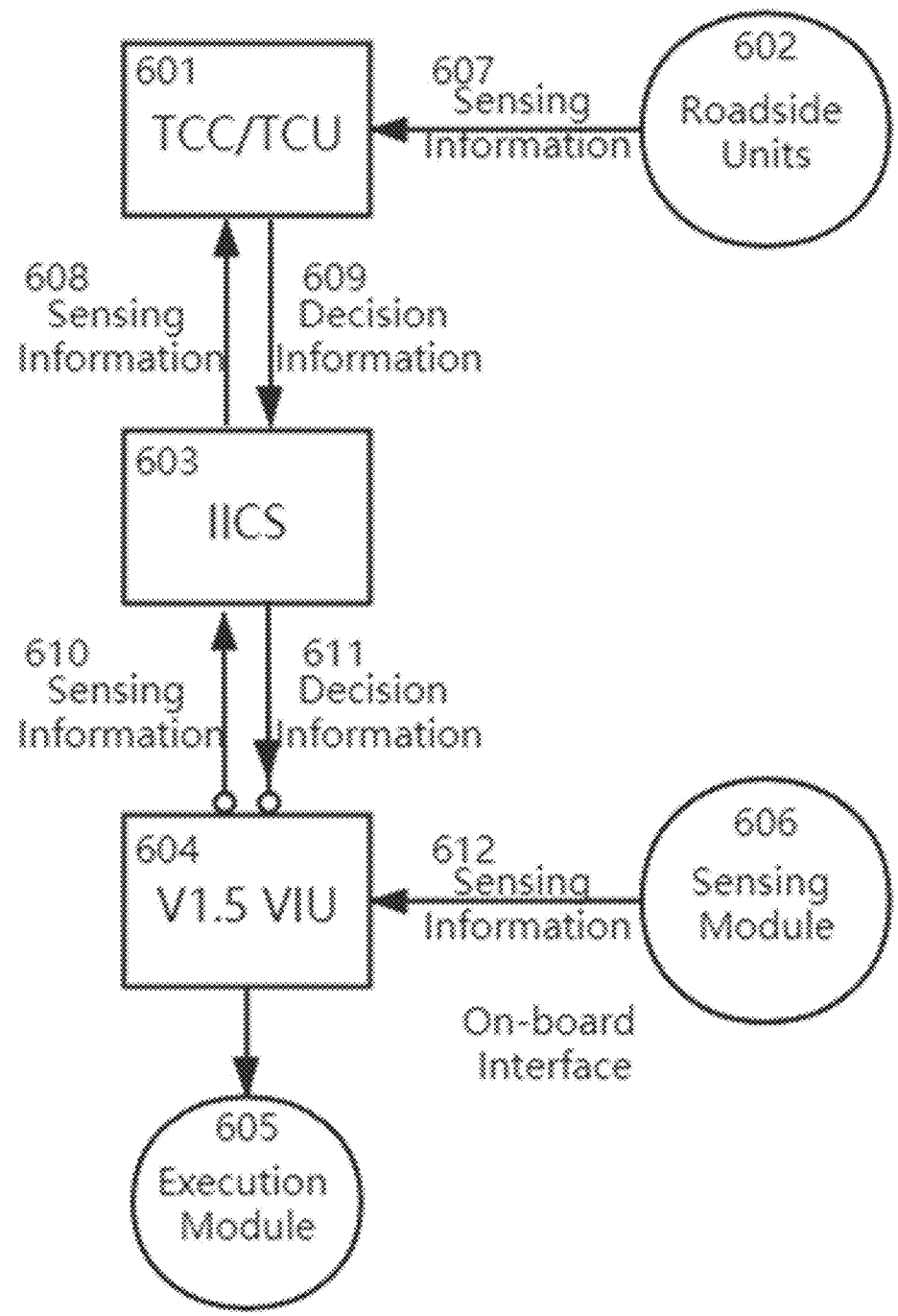
FIG. 6 is a schematic drawing showing a vehicle-end connector for a V1.5 CAV. 601, Traffic Control Center (TCC)/Traffic Control Unit (TCU); 602, Roadside Units (RIU); 603, Intelligent Information Conversion System (IICS); 604, Vehicle Intelligent Unit (VIU) of V1.5 CAV; 605, Execution module; 606, Sensing module of V1.5 CAV; 607, Sensing information communicated from the roadside units to TCC/TCU; 608, Sensing information communicated from IICS to TCC/TCU; 609, Decision information communicated from TCC/TCU to IICS; 610, Sensing information communicated from VIU of V1.5 CAV to IICS; 611, Decision information communicated from IICS to VIU of V1.5 CAV; 612, Sensing information communicated from sensing module to VIU of V1.5 CAV.

In some embodiments, IRIS issues control commands to the execution modules of CAV at intelligence levels of, e.g., V1, V1.5, V2, V3, V4, or higher (e.g., V5) through the IICS. In some embodiments, e.g., as shown in FIG. 6, the IICS is configured to support and/or facilitate automated driving for CAV at low intelligence level (e.g., V1, V1.5), wherein the IRIS and IICS coordinate to provide complete, sufficiently complete, and/or essentially complete information integration and decision-making tasks and to send decision-making plans and control instructions to CAV. In some embodiments, when the CAV collaborates with road infrastructure to provide an automated driving function, the TCC/TCU receives sensing information from the RIU and/or receives sensing information from the vehicle (e.g., from the vehicle VIU); the IRIS makes a decision (e.g., based on the road environment, road geometry information, and the vehicle driving information from TICS); and the IRIS issues vehicle-specific and time-sensitive control instructions through IICS to CAV; and the CAV performs vehicle control operations according to the decision information and/or vehicle-specific and time-sensitive control instructions sent by IICS. In some embodiments, data and/or information provided by roadside infrastructure sensors supports the decision-making of TCC/TCU. In some embodiments, the vehicle-end information and/or data provides feedback to verify and/or to adjust the decision-making (e.g., to provide data for machine learning).

Figure 7:
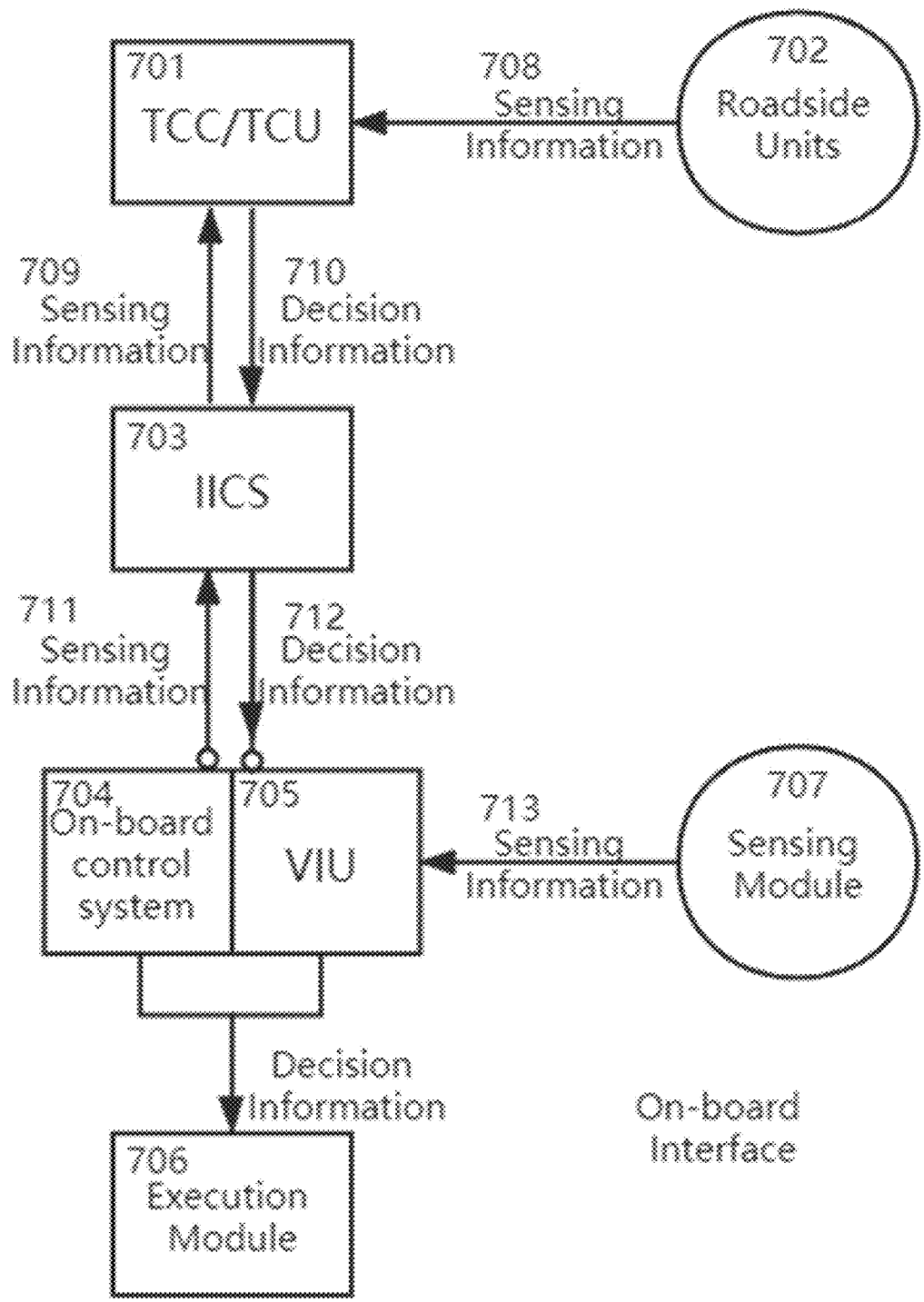
FIG. 7 is a schematic drawing showing a vehicle-end connector for a V2 and/or V3 CAV. 701, Traffic Control Center (TCC)/Traffic Control Unit (TCU); 702, Roadside Units (RIU); 703, Intelligent Information Conversion System (IICS); 704, On-board control system; 705, Vehicle Intelligent Unit (VIU) of V2 and/or V3 CAV; 706, Execution module; 707, Sensing module of V2 and/or V3 CAV; 708, Sensing information communicated from the roadside units to TCC/TCU; 709, Sensing information communicated from IICS to TCC/TCU; 710, Decision information communicated from TCC/TCU to IICS; 711, Sensing information communicated from VIU and/or on-board control system to IICS; 712, Decision information communicated from IICS to VIU and/or on-board control system; 713, Sensing information communicated from sensing module to VIU and/or on-board control system.

In some embodiments, e.g., as shown in FIG. 7, the IICS is configured to support and/or facilitate automated driving for CAV at medium intelligence levels (e.g., V2 and V3), wherein the VIU exchanges data and/or information with IICS based on the information requirements of the driving task; and/or the roadside information and/or data provided through IICS helps the VIU to perform automated driving tasks. In some embodiments, the IICS provides storage of previous decisions, control instructions, and automated driving outcomes resulting from the previous decisions and/or control instructions to improve the accumulation of previous decisions, control instructions, and automated driving outcomes resulting from the previous decisions and/or control instructions, e.g., to provide data for machine learning. In some embodiments, the IICS provides machine learning to modify previous decisions and/or control instructions to provide improved automated driving control decisions and/or control instructions to VIU (e.g., to adapt automated driving to more types of driving environments), thus providing a strategy for driving task collaboration.

In some embodiments, e.g., as shown in FIG. 7, the IICS is configured to support and/or facilitate automated driving for CAV at medium intelligence levels (e.g., V2 and V3) by facilitating collaborative automated driving between CAV and an intelligent road section to provide a specific automated driving function. For example, in some embodiments, a TCC/TCU receives sensing information from a RIU and/or VIU; the IRIS transmits information through the IICS to VIU; and the VIU transmits vehicle control instructions to the vehicle on-board control system and vehicle execution module, which provides mechanical control of the vehicle. In some embodiments, the TCC/TCU receives information and/or data from the roadside infrastructure and/or vehicle-end information and/or data through the IICS, and the vehicle on-board control system operates the vehicle according to vehicle status information, road geometry information, target object information, and the vehicle experience memory. In some embodiments, the vehicle on-board control system facilitates system collaboration (e.g., collaboration between CAV and ADS) by providing support and assistance to IRIS to produce and issue appropriate operating instructions; in some embodiments, IRIS facilitates collaboration (e.g., collaboration between CAV and ADS) by providing support and assistance to the on-board control system to produce and issue appropriate operating instructions.

Figure 8:
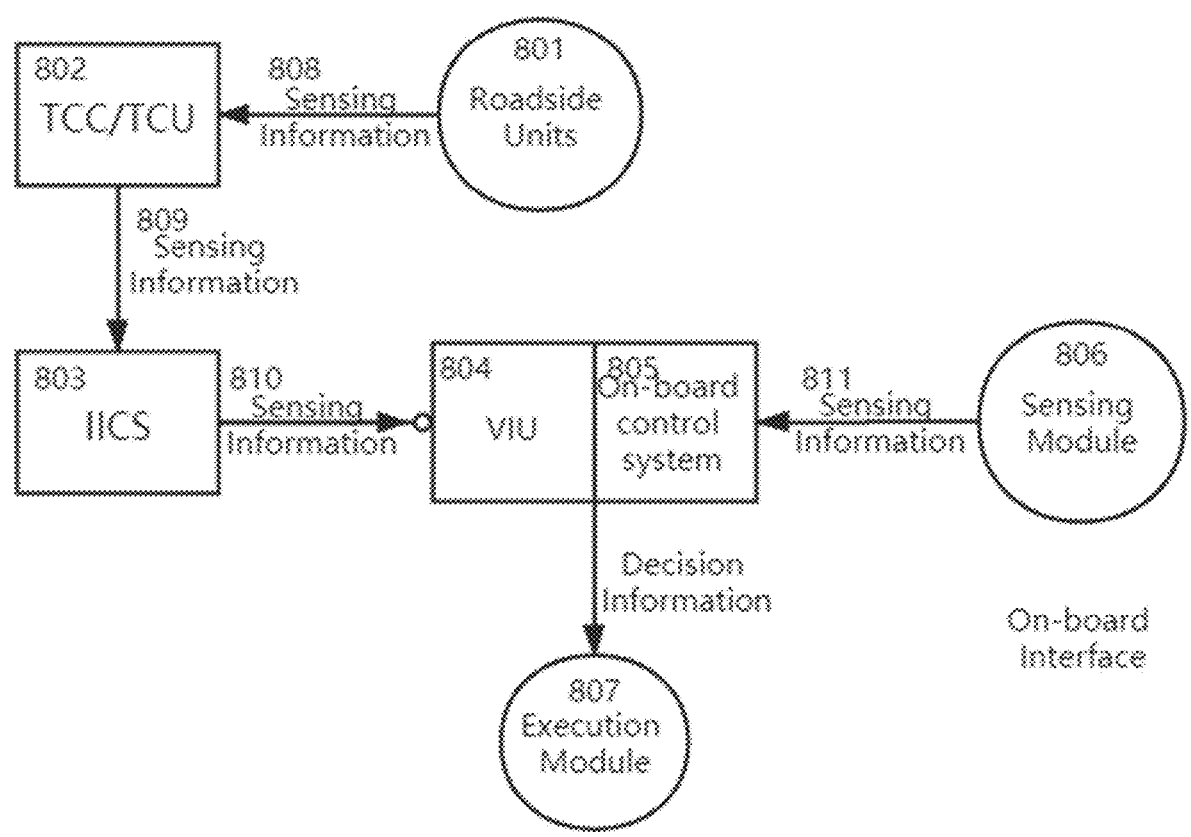
FIG. 8 is a schematic drawing showing a vehicle-end connector of a V4 CAV. 801, Roadside units (RIU); 802, Traffic Control Center (TCC)/Traffic Control Unit (TCU); 803, Intelligent Information Conversion System (IICS); 804, Vehicle Intelligent Unit (VIU) of V4 CAV; 805, On-board control system; 806, Sensing module of V4 CAV; 807, Execution module; 808, Sensing information communicated from the roadside units to TCC/TCU; 809, Sensing information communicated from TCC/TCU to IICS; 810, Sensing information communicated from IICS to VIU and/or on-board control system; 811, Sensing information communicated from sensing module to VIU and/or on-board control system.

In some embodiments, e.g., as shown in FIG. 8, the IICS is configured to support and/or facilitate automated driving for CAV at high intelligence levels (e.g., V4 and above). For example, in some embodiments, the IICS sends roadside sensing information and/or data to the VIU to provide support and assistance to the vehicle control system. In some embodiments, TCC/TCU receives sensing information and/or data from RIU (e.g., only from RIU) when CAV perform vehicle-road collaboration on an intelligent road section to provide a specific automated driving function. In some embodiments, the TCC/TCU and the vehicle on-board control system sense traffic information and/or driving behavior information relatively independently; and the vehicle control system receives sensing information and/or data from the VIU and/or roadside sensing information and/or data transmitted by IICS and makes a decision independently. In some embodiments, roadside sensing information and/or data are transmitted to VIU through IICS, and the information and/or data are transmitted to the on-board control system to assist the vehicle control system to produce and issue control and decision information to the execution module.

In some embodiments, a control execution result is transmitted to IRIS through IICS for data backup and/or to provide feedback to verify and/or to adjust the decision-making.

In some embodiments, the IRIS receives vehicle sensing information transmitted by IICS and receives sensing information from roadside infrastructure. The TCU/TCC provides a driving behavior decision plan, control instructions are formulated, and the plan and/or control instructions are issued by IICS.

In some embodiments, the IRIS, IICS, and the vehicle-end hardware communicate with each other using their respective communication modules and one or more communication technologies (e.g., including but not limited to a dedicated short-range communication technology (DSRC), 4G, 5G, and 6G).

In some embodiments, the technology provides methods for classifying information based on one or more of information frequency, safety demand, precision, spatial scope, and/or being static or dynamic (e.g., being changing or unchanging in time). In some embodiments, the technology provides methods for classifying information based on two or more of information frequency, safety demand, precision, spatial scope, and/or being static or dynamic (e.g., being changing or unchanging in time). See, e.g., Tables 2-7.

In some embodiments, the technology provides methods for classifying information based on information frequency (e.g., classifying information as high frequency information, medium frequency information, or low frequency information). In some embodiments, the technology provides methods for classifying information based on safety demand, which relates to the degree of importance for information during the process of decision making, motion planning, and control for automated driving. In some embodiments, methods comprise classifying information based on precision, which relates to driving scenarios, driving tasks, and vehicle intelligence levels. In some embodiments, the technology provides methods for classifying information based on spatial scope (e.g., classifying information as macroscopic information relating to road network level information, mesoscopic information relating to road section level information, or microscopic information relating to vehicle level information). In some embodiments, the technology provides methods for classifying information based on the information being static (e.g., information unchanged during the operation of the vehicle) or dynamic (e.g., information changed during the method and/or during operation of the vehicle).

Access Certification

Figure 9:
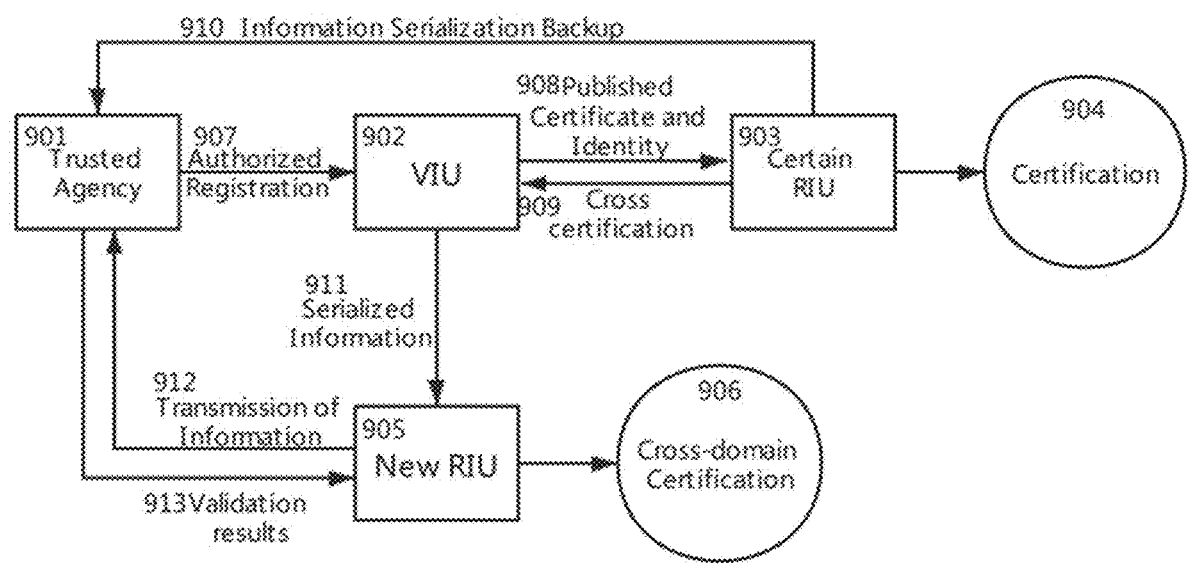
FIG. 9 is a schematic drawing showing a system and process for accessing certification. 901, Trusted agency that provides reliable information; 902, Vehicle Intelligent Unit (VIU); 903, a certain (first) RIU from which a vehicle intends to access certification; 904, confirmation of certification; 905, a new (second) RIU from which the vehicle intends to access certification; 906, confirmation of cross-domain certification; 907, authorized registration provided by the trusted agency; 908, Published certificate and identity sent by VIU to the certain (first) RIU; 909, process of cross-certification; 910, Information serialization backup sent by the certain RIU to the agency; 911, Serialized information sent by VIU to a new (second) RIU; 912, Transmission of information from the new (second) RIU to the agency; 913, Validation results provided by the agency to the new (second) RIU.

In some embodiments, e.g., as shown in FIG. 9, CAV (e.g., a CAV in an IRIS road segment) interacts with a resource provided by another trusted domain through a process for certifying access and/or using an access certification system. In some embodiments, access certification provides permission to a CAV to access IRIS resources. In some embodiments, access certification is mutual (e.g., cross-domain) certification between two ADS (e.g., between a first IRIS and a second IRIS, between an IRIS and another ADS, between a first ADS and a second ADS). In some embodiments, certification (e.g., mutual certification) establishes (e.g., quickly establishes) a trust relationship in a current domain using trust information in a previous domain. In some embodiments, the technology provides a method for certification (e.g., mutual certification). In some embodiments, a method for certification comprises authorizing a CAV (e.g., by a trusted agency), e.g., to obtain a certificate and/or information for offline registration of the CAV as a certified (e.g., trusted) CAV. In some embodiments, the method for mutual certification comprises providing a first certification by verifying the legal status of an RIU when a CAV enters a jurisdiction serviced by the RIU. In some embodiments, verifying the legal status of an RIU comprises comparing the status of an RIU servicing a present jurisdiction to the status of the RIU servicing the jurisdiction into which the CAV is entering. In some embodiments, a VIU of a CAV verifies the status of an RIU when a CAV comprising the VIU enters a jurisdiction services by the RIU. In some embodiments, the method for certification comprises using anonymous information for interaction verification of the CAV with the RIU. In some embodiments, the VIU of the CAV uses anonymous information for interactive verification of the CAV with the RIU. For example, in some embodiments, the RIU serializes a pseudonym and/or information associated with the verifying VIU and stores the pseudonym and/or information associated with the verifying VIU in the system. In some embodiments, the method for certification comprises authenticating the CAV with a RIU when the CAV enters a new jurisdiction serviced by the RIU. For example, in some embodiments, authenticating the CAV with a RIU comprises a VIU of the CAV providing the pseudonym and/or information identifying the VIU to the RIU; the RIU querying the certification system and/or trusted agency using the pseudonym and/or information identifying the VIU; and the RIU receiving verification results from the trusted agency and/or system that identifies the VIU as a certified (e.g., trusted) VIU and, accordingly, provides the mutual (e.g., cross-domain) certification of the CAV with the RIU.

CAV Sensors and Sensing

Figure 4:
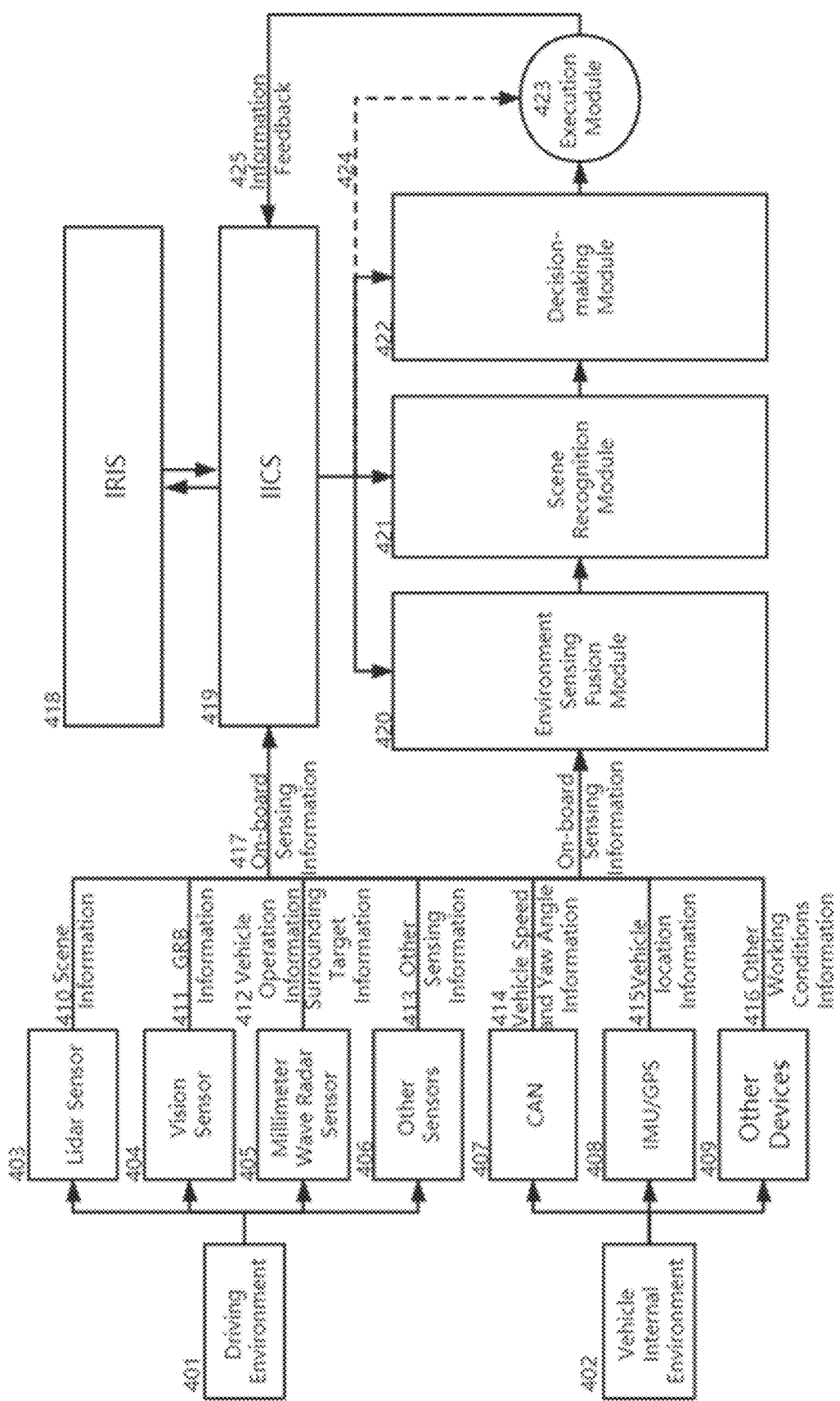
FIG. 4 is a schematic drawing showing exemplary hardware subsystems, modules, connections, and/or functions of an intelligent on-board unit; sensing information and/or data collected by the intelligent on-board unit; and/or communications and/or data flow within the intelligent on-board unit. 401, Subsystem for sensing the driving environment; 402, Subsystem for sensing the internal environment of the vehicle; 403, Lidar sensor; 404, Vision sensor; 405, Millimeter-wave radar sensor; 406, Other sensors; 407, Controller Area Network (CAN); 408, Inertial Measurement Unit (IMU)/Global Positioning System (GPS); 409, Other devices; 410, Scene information collected for the three-dimensional point cloud data; 411, color (e.g., RGB) information collected for establishing a three-dimensional simulation model; 412, Vehicle operation information and surrounding target information; 413, Other sensing information; 414, Vehicle speed and yaw angle information; 415, Vehicle location information; 416, Other vehicle working conditions information; 417, On-board sensing information transmitted to IICS and on-board control system; 418, Intelligent Road Infrastructure System (IRIS); 419, Intelligent Information Conversion System (IICS); 420, Environment sensing fusion module that fuses information from vehicles and roadside; 421, Scene recognition module; 422, Decision-making module; 423, Execution module; 424, Influence on the execution module from IICS is based on the intelligence level of vehicles; 425, Information feedback to IICS for backup.

In some embodiments, CAV comprises a number of sensors, a number of sensing capabilities, and/or are configured to perform a number of sensing functions. In some embodiments, e.g., as shown in FIG. 4, CAV comprise an on-board unit (e.g., a VIU) comprising an external environment (e.g., driving environment) sensing module and/or an internal environment sensing module. In some embodiments, the external environment sensing module is configured to operate with sensors including, e.g., lidar, vision sensors, radar (e.g., millimeter-wave radar), and other sensors. In some embodiments, CAV are configured to provide (e.g., transmit, communicate, send) information and/or data from sensors to the IICS. Accordingly, in some embodiments, CAV comprise a communications module configured to communicate with IICS (e.g., a communications module of the IICS) and/or to transmit sensor data and/or other information to the IICS (e.g., a communications module of the IICS).

For example, in some embodiments, a CAV lidar sensor collects and/or records depth information and/or three-dimensional point cloud data (e.g., in some embodiments, a CAV lidar sensor collects and/or records three-dimensional point cloud data with associated reflection intensities). In some embodiments, the CAV and/or lidar transmits the depth information and the three-dimensional point cloud data (e.g., further comprising associated reflection intensities) to IICS.

In some embodiments, a CAV vision sensor collects and/or records color (e.g., RGB) information of a scene and/or provides (e.g., constructs) a three-dimensional simulation model based on the geometric information sensed from the environment. In some embodiments, the CAV and/or vision sensor transmits color (e.g., RGB) information of a scene and/or sends the three-dimensional simulation model to IICS.

In some embodiments, a CAV radar (e.g., millimeter-wave radar) sensor collects operation information and/or the location of the CAV and/or collects information about objects around the CAV. In some embodiments, the CAV and/or radar (e.g., millimeter-wave radar) transmits the location of the CAV and/or transmit information about objects around the CAV to IICS.

In some embodiments, a CAV auxiliary sensor and/or auxiliary sensing system collects operation information and/or the location of the CAV and/or collects information about objects around the CAV. In some embodiments, the CAV auxiliary sensor and/or auxiliary sensing system transmits the location of the CAV and/or transmit information about objects around the CAV to IICS.

In some embodiments, the internal environment sensing module is configured to operate and/or communicate with various devices and/or functions including, e.g., a Controller Area Network (CAN) and/or an Inertial Measurement Unit (IMU)/Global Positioning System (GPS) component. For example, in some embodiments, the CAN obtains a speed and/or a yaw angle information of a CAV. In some embodiments, the CAN transmits a speed and/or a yaw angle information of a CAV to a sensing fusion module. In some embodiments, the IMU/GPS component obtains the precise location information of a CAV, e.g., using the GPS for general positioning (e.g., because GPS error does not accumulate) and/or the IMU is used for short-term real-time positioning.

Intelligent Road Infrastructure Systems

In some embodiments, the technology relates to an intelligent information conversion system (IICS) for an intelligent road infrastructure, e.g., an Intelligent Road Infrastructure System (IRIS) (e.g., as described in U.S. Pat. Nos. 10,867,512 and/or 10,692,365, each of which is incorporated herein by reference). An IRIS which facilitates vehicle operations and control for connected automated vehicle highway (CAVH) systems. In some embodiments, an IRIS provides vehicles with individually customized information and real-time control instructions for vehicles to fulfill driving tasks, e.g., car following, lane changing, and route guidance. Further, in some embodiments, IRIS systems and methods manage transportation operations and management services for both freeways and urban arterials. In some embodiments, IRIS manages a portion of lanes or all lanes of a highway. In some embodiments, IRIS provides vehicle-specific control instructions and/or vehicle-specific information to CAV (e.g., to a VIU of a CAV).

In some embodiments, IRIS comprise or consist of one of more of the following subsystems: (1) Roadside intelligent unit (RIU) network; (2) Traffic Control Unit (TCU) and Traffic Control Center (TCC) network; (TCU/TCC network); (3) vehicle intelligent unit (VIU); (4) traffic operations centers (TOC); and/or (5) cloud information and computing services. In some embodiments, IRIS manages one or more of the following function categories: sensing, transportation behavior prediction and management, planning and decision making, and vehicle control. In some embodiments, IRIS is supported by real-time wired and/or wireless communication, power supply networks, and cyber safety and security services.

Accordingly, IRIS provides a comprehensive system configured to provide full vehicle operations and control for CAV and/or CAVH systems by sending individual vehicles with detailed and time-sensitive control instructions. In some embodiments, vehicle-specific instructions and/or information are constructed and/or optimized by a TCC, passed from the TCC to a TCU, sent by the TCU to the RIU network, and distributed by RIU to CAV (e.g., transmitted to a VIU of a CAV). Thus, the IRIS comprises TCC, TCU, and RIU in a hierarchical structure that provides coverage over different spatial scales.

Although the disclosure herein refers to certain illustrated embodiments, it is to be understood that these embodiments are presented by way of example and not by way of limitation. All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. An intelligent information conversion system (IICS) configured to:
   connect an automatic driving system (ADS) and a connected and automated vehicle (CAV); and
   provide real-time dynamic information exchange between said ADS and said CAV; and comprise a code book, a coding module, a connector module, and a supporting system,
   wherein the code book provides a standardized format for information exchange,
   wherein said code book uses a sequence of integers, wherein each integer has a value corresponding to a value of a category,
   wherein said code book is used for converting various types of information to meet different automatic driving requirements,
   wherein the coding module comprises an encoding module.

2. The IICS of claim 1, wherein the IICS improves a service level of said ADS from a first service level to a second service level, wherein the first service level is not adequate to provide automatic driving for said CAV and the second service level is adequate to provide automatic driving for said CAV.

3. The IICS of claim 1, configured to sort information in a code book string, encode information into the code book string, and decode information from the code book string.

4. The IICS of claim 1, comprising an encoding module and a decoding module configured to:
   encode information into a code book string and decode information from a code book string;
   facilitate real-time dynamic information interaction between said CAV and said ADS;
   facilitate real-time dynamic information interaction between said CAV and said road infrastructure; or
   exchange information between said CAV and said ADS by encoding information received from said CAV and/or said ADS into a code book string; and by decoding a code book string into information for transmission to said CAV and/or said ADS.

5. The IICS of claim 4, wherein said code book string has a format provided by a code book standardized format for information exchange.

6. The IICS of claim 1, comprising:
   a road-side connector component configured to exchange information between the IICS and roadside infrastructure; and
   a vehicle-side connector component configured to exchange information between the IICS and a vehicle.

7. The IICS of claim 1, wherein at least one said category is selected from the group consisting of: vehicle automation level, original equipment manufacturer, vehicle brand, vehicle model year, vehicle type, road category, highway level, urban road level, road intelligence level, information function level, information category I-frequency, information category II-safety demand, information category III-precision, information category IV-scope, information category V-static and dynamic, and information category VI-name.

8. The IICS of claim 7, configured to classify information based on the frequency of update of the information to assign a value to information category I-frequency of high frequency, medium frequency, or low frequency.

9. The IICS of claim 7, configured to classify information based on the safety demand of the information comprising assessing the importance of the information for decision making, motion planning, and/or control of automated vehicles; and assigning a value to information category II-safety demand of high safety demand, medium safety demand, or low safety demand.

10. The IICS of claim 7, configured to classify information based on precision of the information comprising assessing a driving scenario, driving task, and/or vehicle intelligence level; and assigning a value to information category III-precision of high precision, medium precision, or low precision.

11. The IICS of claim 7, configured to classify information based on the scope of the information comprising assessing the scope of the information and assigning a value to information category IV-scope of macroscopic, mesoscopic, or microscopic, wherein macroscopic information comprises road network level information; mesoscopic information comprises road section level information; and microscopic information comprises vehicle level information.

12. The IICS of claim 7, configured to classify information based on the static or dynamic characteristics of the information comprising assessing the dynamic and static characteristics of the information; and assigning a value to information category V-static or dynamic of static or dynamic, wherein static information comprises information that is unchanged during the operation of the vehicle; and dynamic information comprises information that changes during the operation of the vehicle.

13. The IICS of claim 1, configured to receive vehicle information and/or information demands from a vehicle.

14. The IICS of claim 13, wherein said vehicle comprises a vehicle intelligence unit (VIU).

15. The IICS of claim 1, wherein said CAV comprises a vehicle-end connector component.

16. The IICS of claim 15, wherein said vehicle-end connector component comprises:
    an environment sensing module configured to sense the surrounding environment of the CAV; and/or to collect data from external vehicle sensors;
    an internal environment sensing module configured to sense the status of the CAV, to sense the internal environment of the CAV, and to sense the driver status; and/or to collect data from internal vehicle sensors;
    a cognitive module configured to collect semantic information and/or cognitive information describing the CAV environment; and
    a decision-making module configured to provide vehicle control decisions.

17. The IICS of claim 16, wherein said cognitive module is configured to integrate vehicle sensor information and roadside infrastructure information from IICS.

18. The IICS of claim 16, wherein said decision-making module is configured to make decisions based on stored data, stored control decisions, and/or stored outcomes of control decision execution.

19. The IICS of claim 16, wherein the environment sensing module is configured to integrate data and/or information from vehicle sensors with data and/or information from roadside infrastructure sensors obtained from IICS to describe the CAV environment and predict vehicle trajectory.

20. The IICS of claim 1 configured to assist said CAV at intelligence level V1 or V1.5, wherein an IRIS and the IICS perform information integration and decision making; and send vehicle control instructions to said CAV.

21. The IICS of claim 1 configured to assist said CAV at intelligence level V2 or V3, wherein a VIU exchanges information with the IICS based on the information requirements of a driving task; and the roadside data and/or information provided through the IICS supports the VIU to complete a driving task.

22. The IICS of claim 1 configured to assist said CAV at intelligence level V4 or above, wherein the IICS transmits the roadside sensing information and/or data to a VIU to support the CAV vehicle control system.

* * * * *